US011165707B2

(12) United States Patent
Gupta et al.

(10) Patent No.: US 11,165,707 B2
(45) Date of Patent: Nov. 2, 2021

(54) DYNAMIC POLICY IMPLEMENTATION FOR APPLICATION-AWARE ROUTING BASED ON GRANULAR BUSINESS INSIGHTS

(71) Applicant: Cisco Technology, Inc., San Jose, CA (US)

(72) Inventors: Kunal Gupta, Sunnyvale, CA (US); Aditya Ranjit Jagtiani, Newark, CA (US); Venkata Krishna Reddy Konala, Redwood City, CA (US); Bhuvnesh Kumar, San Francisco, CA (US); Kamlesh Shah, Cary, NC (US); James Richard Schneider, Frisco, TX (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/674,829

(22) Filed: Nov. 5, 2019

(65) Prior Publication Data

US 2020/0328978 A1    Oct. 15, 2020

Related U.S. Application Data

(60) Provisional application No. 62/833,482, filed on Apr. 12, 2019.

(51) Int. Cl.
*H04L 12/813* (2013.01)
*H04L 12/24* (2006.01)
(Continued)

(52) U.S. Cl.
CPC .............. *H04L 47/20* (2013.01); *H04L 41/20* (2013.01); *H04L 61/2007* (2013.01); *H04L 45/50* (2013.01)

(58) Field of Classification Search
CPC ..... H04L 47/20; H04L 61/2007; H04L 45/50; H04L 41/20
(Continued)

(56) References Cited

U.S. PATENT DOCUMENTS 6,944,678 B2    9/2005  Lu et al.
7,719,995 B2    5/2010  Luft
(Continued)

FOREIGN PATENT DOCUMENTS

EP    2642790 A1    9/2013
EP    1999635 B1    12/2013

*Primary Examiner* — Mahran Y Abu Roumi
(74) *Attorney, Agent, or Firm* — Behmke Innovation Group LLC; James M. Behmke; Jonathon P. Western

(57) ABSTRACT

In one embodiment, a process captures one or more features of an initiated application transaction within an application, and applies the one or more features to one or more application-based policies. In response to determining a policy trigger for the initiated application transaction based on applying the one or more features to the one or more application-based policies, the process may then obtain a network address associated with the application. Once the process maps the particular policy trigger from the one or more application-based policies to one or more corresponding network-based policies, then the process can instruct a network controller to apply the one or more corresponding network-based policies to the network address associated with the application, causing the network controller to configure a computer network to manage network traffic associated with the network address according to the one or more corresponding network-based policies.

12 Claims, 13 Drawing Sheets

(51) Int. Cl.
*H04L 29/12* (2006.01)
*H04L 12/723* (2013.01)

(58) Field of Classification Search
USPC .......................................................... 709/223
See application file for complete search history.

(56) References Cited

U.S. PATENT DOCUMENTS

| | | |
|---|---|---|
| 7,843,843 B1 | 11/2010 | Papp, III et al. |
| 9,100,268 B2 | 8/2015 | Dolganow et al. |
| 9,219,579 B2 | 12/2015 | Rao et al. |
| 9,756,294 B2 | 9/2017 | Saptharishi |
| 2002/0199014 A1 | 12/2002 | Yang et al. |
| 2009/0225762 A1* | 9/2009 | Davidson ............... H04L 67/32 370/401 |
| 2013/0298184 A1* | 11/2013 | Ermagan ................ H04L 63/20 726/1 |
| 2014/0140211 A1* | 5/2014 | Chandrasekaran ......................... H04W 28/0268 370/235 |
| 2014/0237118 A1 | 8/2014 | Matthews |
| 2015/0288708 A1* | 10/2015 | Lietz .................. H04L 63/1416 726/23 |
| 2016/0182329 A1* | 6/2016 | Armolavicius ..... H04L 41/0893 370/230 |
| 2018/0375760 A1* | 12/2018 | Saavedra ............ H04L 12/4633 |
| 2019/0245830 A1* | 8/2019 | Ratnasingham ........ H04L 63/20 |
| 2020/0244581 A1* | 7/2020 | Chunduru Venkata ...................... H04L 45/745 |
| 2020/0257691 A1* | 8/2020 | Bhattacharjee ....... G06F 16/901 |
| 2020/0274777 A1* | 8/2020 | Liu ..................... H04L 41/0806 |

\* cited by examiner

DYNAMIC POLICY IMPLEMENTATION FOR APPLICATION-AWARE ROUTING BASED ON GRANULAR BUSINESS INSIGHTS

RELATED APPLICATION

This application claims priority to U.S. Provisional Application No. 62/833,482, filed on Apr. 12, 2019, entitled DYNAMIC POLICY IMPLEMENTATION FOR APPLICATION-AWARE ROUTING BASED ON GRANULAR BUSINESS INSIGHTS, by Kunal Gupta, et al., the contents of which are incorporated herein by reference.

TECHNICAL FIELD

The present disclosure relates generally to computer systems, and, more particularly, to dynamic policy implementation for application-aware routing based on granular business insights.

BACKGROUND

The Internet and the World Wide Web have enabled the proliferation of web services available for virtually all types of businesses. Due to the accompanying complexity of the infrastructure supporting the web services, it is becoming increasingly difficult to maintain the highest level of service performance and user experience to keep up with the increase in web services. For example, it can be challenging to piece together monitoring and logging data across disparate systems, tools, and layers in a network architecture. Moreover, even when data can be obtained, it is difficult to directly connect the chain of events and cause and effect.

In addition, software-defined wide area networks (SD-WANs) represent the application of software-defined networking (SDN) principles to WAN connections, such as connections to cellular networks, the Internet, and Multiprotocol Label Switching (MPLS) networks. The power of SD-WAN is the ability to provide consistent service level agreement (SLA) for important application traffic transparently across various underlying tunnels of varying transport quality and allow for seamless tunnel selection based on tunnel performance characteristics that can match application SLAs.

In particular, with more and more workloads moving to the cloud, companies are looking at SD-WAN solutions to meet their application performance needs. Currently, these SD-WAN solutions make intelligent routing decisions by measuring and monitoring network performance over the hybrid WAN. However, current SD-WAN networking decisions (e.g., routing of packets, establishment of paths, etc.) lack application-based business context.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
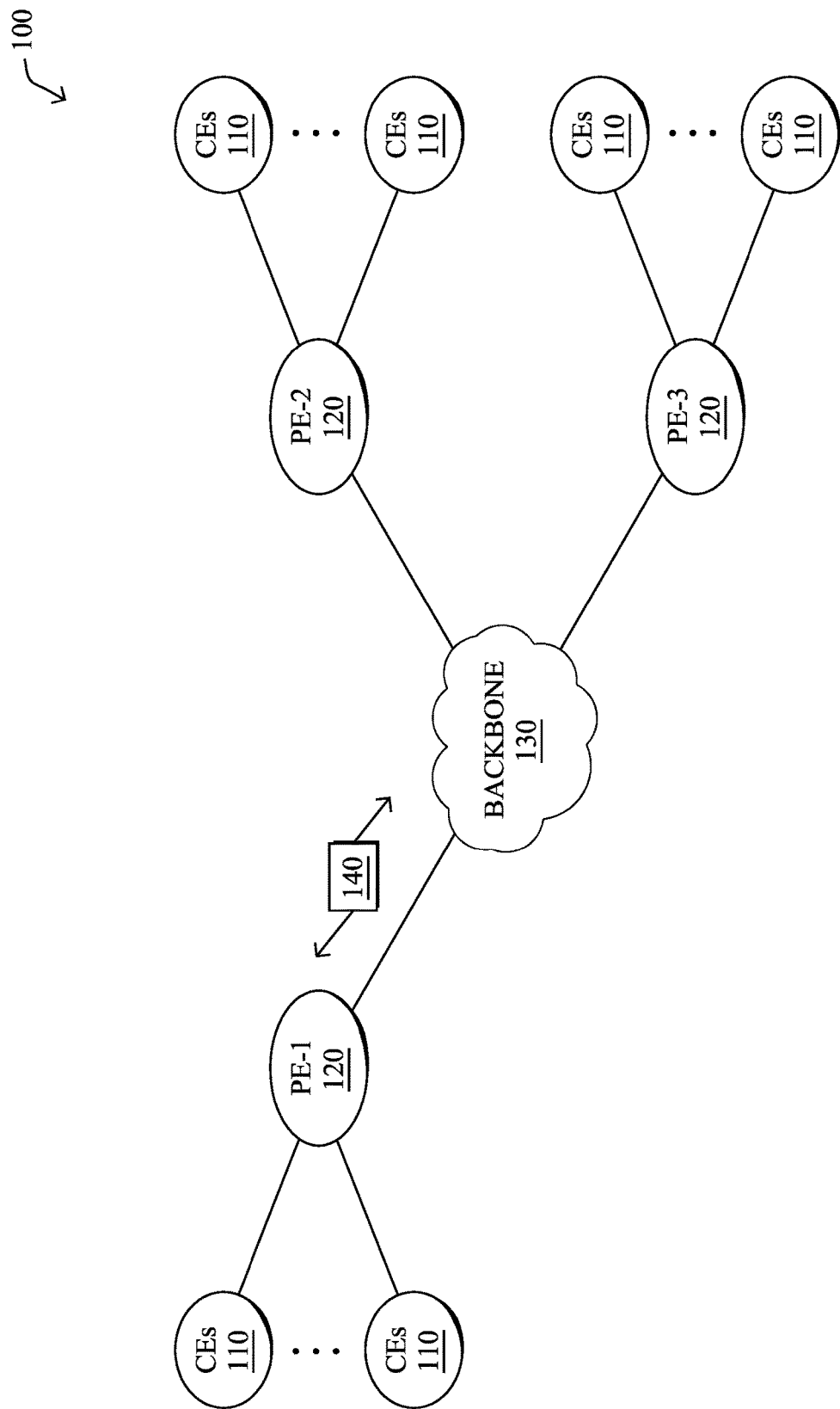
FIGS. 1A-1B illustrate an example computer network.

According to one or more embodiments of the disclosure, techniques herein provide for dynamic policy implementation for application-aware routing based on granular business insights. In particular, in one embodiment, a process captures one or more features of an initiated application transaction within an application, and applies the one or more features to one or more application-based policies. In response to determining a policy trigger for the initiated application transaction based on applying the one or more features to the one or more application-based policies, the process may then obtain a network address associated with the application. Once the process maps the particular policy trigger from the one or more application-based policies to one or more corresponding network-based policies, then the process can instruct a network controller to apply the one or more corresponding network-based policies to the network address associated with the application, causing the network controller to configure a computer network to manage network traffic associated with the network address according to the one or more corresponding network-based policies.

Other embodiments are described below, and this overview is not meant to limit the scope of the present disclosure.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network.

The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or power-line communication networks. That is, in addition to one or more sensors, each sensor device (node) in a sensor network may generally be equipped with a radio transceiver or other communication port, a microcontroller, and an energy source, such as a battery. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics.

Figure 1B:
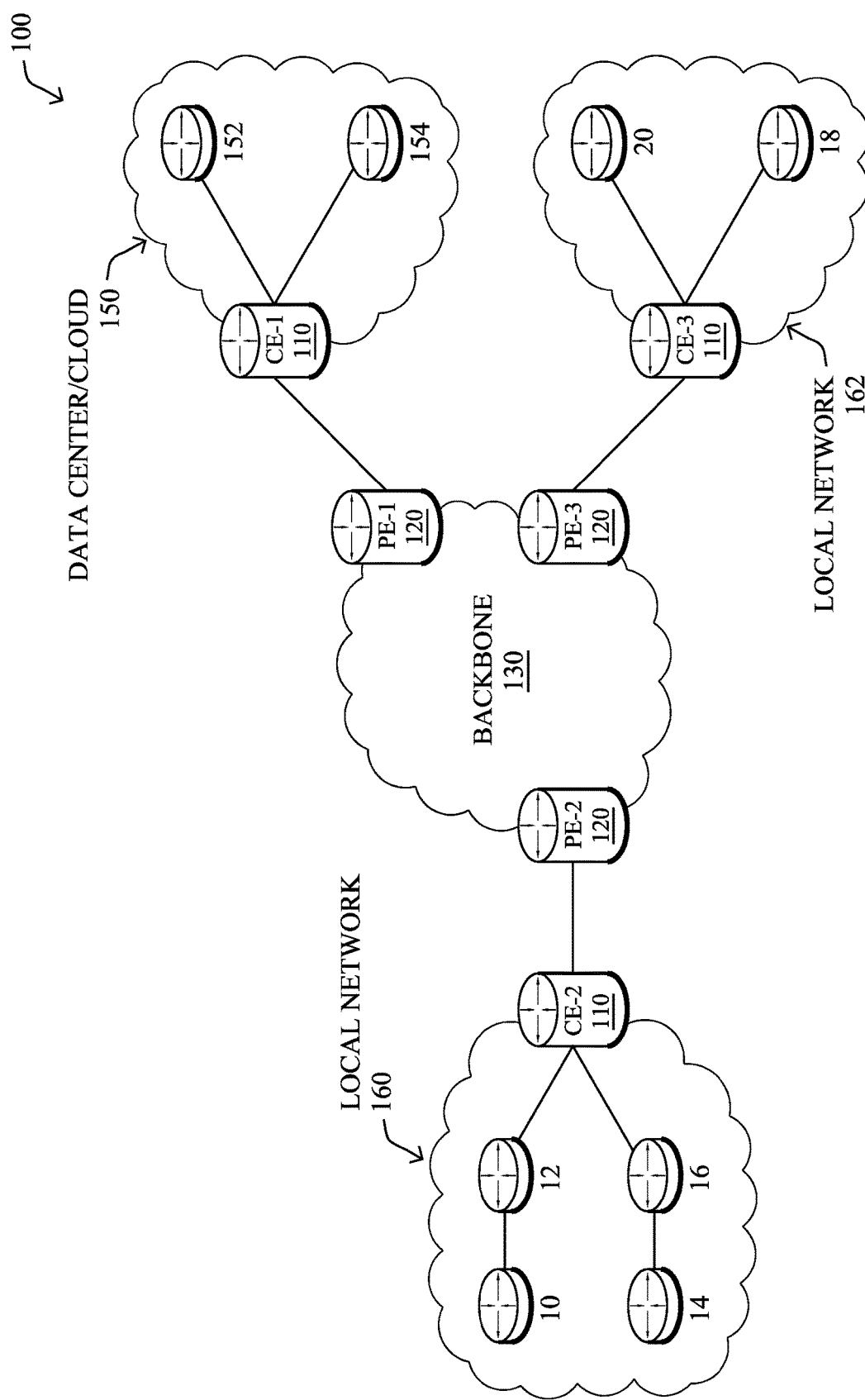

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations. Servers 152-154 may include, in various embodiments, any number of suitable servers or other cloud-based resources. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc. Furthermore, in various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In still further embodiments, a software-defined WAN (SD-WAN) may be used in network 100, such as to connect local network 160, local network 162, and data center/cloud 150. In general, an SD-WAN uses a software defined networking (SDN)-based approach to instantiate tunnels on top of the physical network and control routing decisions, accordingly. For example, as noted above, one tunnel may connect CE-2 at the edge of local network 160 to CE-1 at the edge of data center/cloud 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud 150 on top of the various underlying connections. Another feature of SD-WAN is centralized management by a supervisory service that can monitor and adjust the various connections, as needed.

Figure 2:
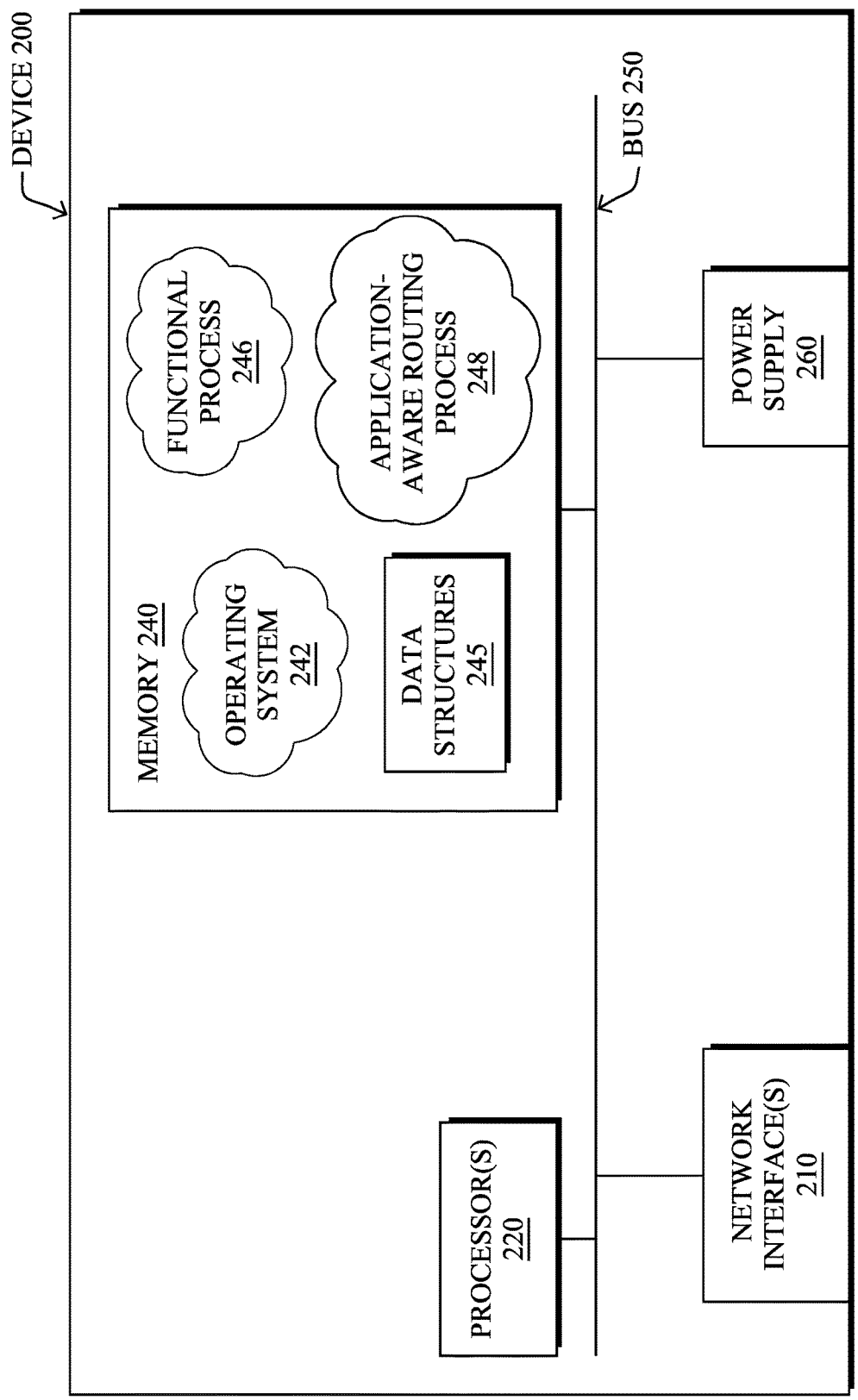
FIG. 2 illustrates an example computing device/node.

FIG. 2 is a schematic block diagram of an example computing device (e.g., apparatus) 200 that may be used with one or more embodiments described herein, e.g., as any of the devices shown in FIGS. 1A-1B above, and particularly as specific devices as described further below. The device may comprise one or more network interfaces 210 (e.g., wired, wireless, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network 100, e.g., providing a data connection between device 200 and the data network, such as the Internet. The network interfaces may be configured to transmit and/or receive data using a variety of different communication protocols. For example, interfaces 210 may include wired transceivers, wireless transceivers, cellular transceivers, or the like, each to allow device 200 to communicate information to and from a remote computing device or server over an appropriate network. The same network interfaces 210 also allow communities of multiple devices 200 to interconnect among themselves, either peer-to-peer, or up and down a hierarchy. Note, further, that the nodes may have two different types of network connections 210, e.g., wireless and wired/physical connections, and that the view herein is merely for illustration. Also, while the network interface 210 is shown separately from power supply 260, for devices using powerline communication (PLC) or Power over Ethernet (PoE), the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise one or more functional processes 246, and on certain devices, an illustrative "Application-Aware Routing" Extension process 248, as described herein. Notably, functional processes 246, when executed by processor(s) 220, cause each particular device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

—Application Intelligence Platform—

The embodiments herein relate to an application intelligence platform for application performance management. In one aspect, as discussed with respect to FIGS. 3-5 below, performance within a networking environment may be monitored, specifically by monitoring applications and entities (e.g., transactions, tiers, nodes, and machines) in the networking environment using agents installed at individual machines at the entities. As an example, applications may be configured to run on one or more machines (e.g., a customer will typically run one or more nodes on a machine, where an application consists of one or more tiers, and a tier consists of one or more nodes). The agents collect data associated with the applications of interest and associated nodes and machines where the applications are being operated. Examples of the collected data may include performance data (e.g., metrics, metadata, etc.) and topology data (e.g., indicating relationship information). The agent-collected data may then be provided to one or more servers or controllers to analyze the data.

Figure 3:
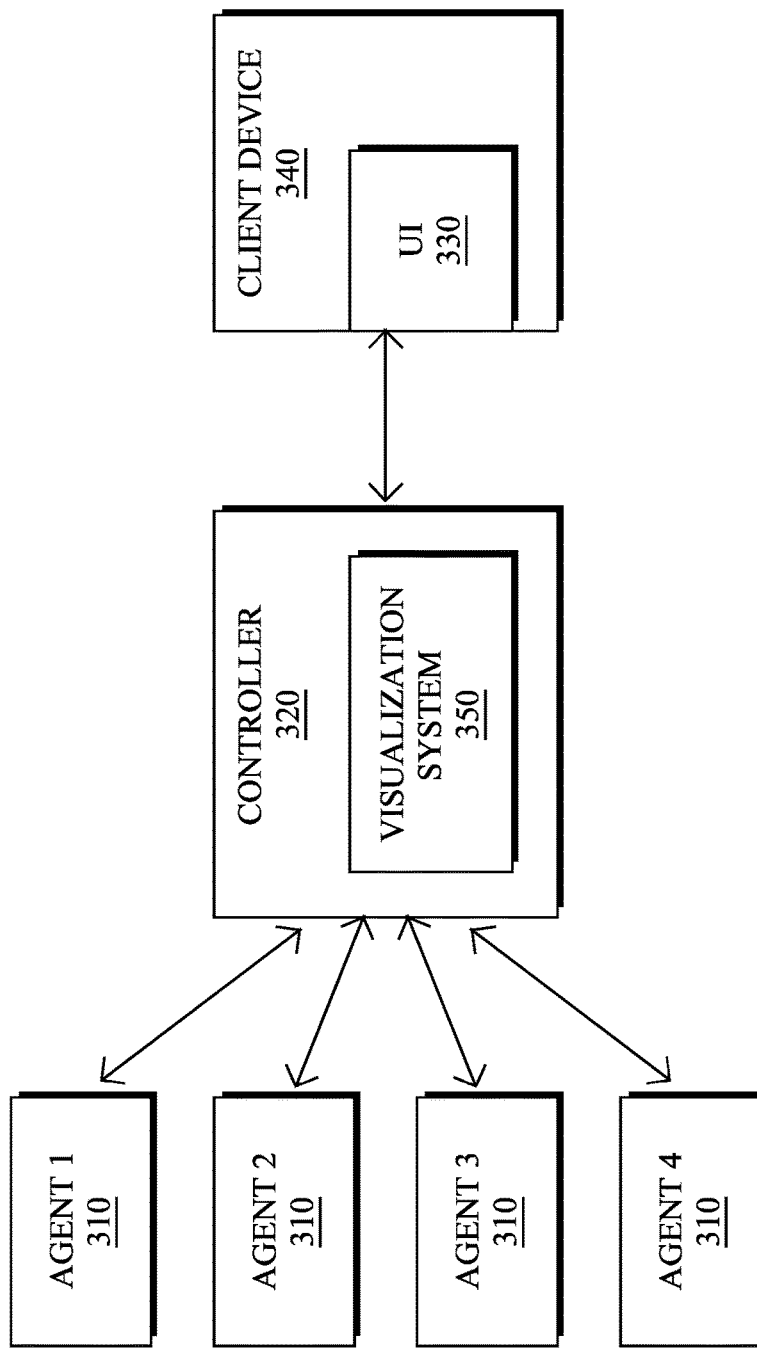
FIG. 3 illustrates an example application intelligence platform.

FIG. 3 is a block diagram of an example application intelligence platform 300 that can implement one or more aspects of the techniques herein. The application intelligence platform is a system that monitors and collects metrics of performance data for an application environment being monitored. At the simplest structure, the application intelligence platform includes one or more agents 310 and one or more servers/controllers 320. Note that while FIG. 3 shows four agents (e.g., Agent 1 through Agent 4) communicatively linked to a single controller, the total number of agents and controllers can vary based on a number of factors including the number of applications monitored, how distributed the application environment is, the level of monitoring desired, the level of user experience desired, and so on.

The controller 320 is the central processing and administration server for the application intelligence platform. The controller 320 serves a browser-based user interface (UI) 330 that is the primary interface for monitoring, analyzing, and troubleshooting the monitored environment. The controller 320 can control and manage monitoring of business transactions (described below) distributed over application servers. Specifically, the controller 320 can receive runtime data from agents 310 (and/or other coordinator devices), associate portions of business transaction data, communicate with agents to configure collection of runtime data, and provide performance data and reporting through the interface 330. The interface 330 may be viewed as a web-based interface viewable by a client device 340. In some implementations, a client device 340 can directly communicate with controller 320 to view an interface for monitoring data. The controller 320 can include a visualization system 350 for displaying the reports and dashboards related to the disclosed technology. In some implementations, the visualization system 350 can be implemented in a separate machine (e.g., a server) different from the one hosting the controller 320.

Notably, in an illustrative Software as a Service (SaaS) implementation, a controller instance 320 may be hosted remotely by a provider of the application intelligence platform 300. In an illustrative on-premises (On-Prem) implementation, a controller instance 320 may be installed locally and self-administered.

The controllers 320 receive data from different agents 310 (e.g., Agents 1-4) deployed to monitor applications, databases and database servers, servers, and end user clients for the monitored environment. Any of the agents 310 can be implemented as different types of agents with specific monitoring duties. For example, application agents may be installed on each server that hosts applications to be monitored. Instrumenting an agent adds an application agent into the runtime process of the application.

Database agents, for example, may be software (e.g., a Java program) installed on a machine that has network access to the monitored databases and the controller. Database agents query the monitored databases in order to collect metrics and pass those metrics along for display in a metric browser (e.g., for database monitoring and analysis within databases pages of the controller's UI 330). Multiple database agents can report to the same controller. Additional database agents can be implemented as backup database agents to take over for the primary database agents during a failure or planned machine downtime. The additional database agents can run on the same machine as the primary agents or on different machines. A database agent can be deployed in each distinct network of the monitored environment. Multiple database agents can run under different user accounts on the same machine.

Standalone machine agents, on the other hand, may be standalone programs (e.g., standalone Java programs) that collect hardware-related performance statistics from the servers (or other suitable devices) in the monitored environment. The standalone machine agents can be deployed on machines that host application servers, database servers, messaging servers, Web servers, etc. A standalone machine agent has an extensible architecture (e.g., designed to accommodate changes).

End user monitoring (EUM) may be performed using browser agents and mobile agents to provide performance information from the point of view of the client, such as a web browser or a mobile native application. Through EUM, web use, mobile use, or combinations thereof (e.g., by real users or synthetic agents) can be monitored based on the monitoring needs. Notably, browser agents (e.g., agents 310) can include Reporters that report monitored data to the controller.

Monitoring through browser agents and mobile agents are generally unlike monitoring through application agents, database agents, and standalone machine agents that are on the server. In particular, browser agents may generally be embodied as small files using web-based technologies, such as JavaScript agents injected into each instrumented web page (e.g., as close to the top as possible) as the web page is served, and are configured to collect data. Once the web page has completed loading, the collected data may be bundled into a beacon and sent to an EUM process/cloud for processing and made ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases.

A mobile agent, on the other hand, may be a small piece of highly performant code that gets added to the source of the mobile application. Mobile RUM provides information on the native mobile application (e.g., iOS or Android applications) as the end users actually use the mobile application. Mobile RUM provides visibility into the functioning of the mobile application itself and the mobile application's interaction with the network used and any server-side applications with which the mobile application communicates.

Application Intelligence Monitoring: The disclosed technology can provide application intelligence data by monitoring an application environment that includes various services such as web applications served from an application server (e.g., Java virtual machine (JVM), Internet Information Services (IIS), Hypertext Preprocessor (PHP) Web server, etc.), databases or other data stores, and remote services such as message queues and caches. The services in the application environment can interact in various ways to provide a set of cohesive user interactions with the application, such as a set of user services applicable to end user customers.

Application Intelligence Modeling: Entities in the application environment (such as the JBoss service, MQSeries modules, and databases) and the services provided by the entities (such as a login transaction, service or product search, or purchase transaction) may be mapped to an application intelligence model. In the application intelligence model, a business transaction represents a particular service provided by the monitored environment. For example, in an e-commerce application, particular real-world services can include a user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

Business Transactions: A business transaction representation of the particular service provided by the monitored environment provides a view on performance data in the context of the various tiers that participate in processing a particular request. A business transaction, which may each be identified by a unique business transaction identification (ID), represents the end-to-end processing path used to fulfill a service request in the monitored environment (e.g., adding items to a shopping cart, storing information in a database, purchasing an item online, etc.). Thus, a business transaction is a type of user-initiated action in the monitored environment defined by an entry point and a processing path across application servers, databases, and potentially many other infrastructure components. Each instance of a business transaction is an execution of that transaction in response to a particular user request (e.g., a socket call, illustratively associated with the TCP layer). A business transaction can be created by detecting incoming requests at an entry point and tracking the activity associated with request at the originating tier and across distributed components in the application environment (e.g., associating the business transaction with a 4-tuple of a source IP address, source port, destination IP address, and destination port). A flow map can be generated for a business transaction that shows the touch points for the business transaction in the application environment. In one embodiment, a specific tag may be added to packets by application specific agents for identifying business transactions (e.g., a custom header field attached to a hypertext transfer protocol (HTTP) payload by an application agent, or by a network agent when an application makes a remote socket call), such that packets can be examined by network agents to identify the business transaction identifier (ID) (e.g., a Globally Unique Identifier (GUID) or Universally Unique Identifier (UUID)).

Performance monitoring can be oriented by business transaction to focus on the performance of the services in the application environment from the perspective of end users. Performance monitoring based on business transactions can provide information on whether a service is available (e.g., users can log in, check out, or view their data), response times for users, and the cause of problems when the problems occur.

A business application is the top-level container in the application intelligence model. A business application contains a set of related services and business transactions. In some implementations, a single business application may be needed to model the environment. In some implementations, the application intelligence model of the application environment can be divided into several business applications. Business applications can be organized differently based on the specifics of the application environment. One consideration is to organize the business applications in a way that reflects work teams in a particular organization, since role-based access controls in the Controller UI are oriented by business application.

A node in the application intelligence model corresponds to a monitored server or JVM in the application environment. A node is the smallest unit of the modeled environment. In general, a node corresponds to an individual application server, JVM, or Common Language Runtime (CLR) on which a monitoring Agent is installed. Each node identifies itself in the application intelligence model. The Agent installed at the node is configured to specify the name of the node, tier, and business application under which the Agent reports data to the Controller.

Business applications contain tiers, the unit in the application intelligence model that includes one or more nodes. Each node represents an instrumented service (such as a web application). While a node can be a distinct application in the application environment, in the application intelligence model, a node is a member of a tier, which, along with possibly many other tiers, make up the overall logical business application.

Tiers can be organized in the application intelligence model depending on a mental model of the monitored application environment. For example, identical nodes can be grouped into a single tier (such as a cluster of redundant servers). In some implementations, any set of nodes, identical or not, can be grouped for the purpose of treating certain performance metrics as a unit into a single tier.

The traffic in a business application flows among tiers and can be visualized in a flow map using lines among tiers. In addition, the lines indicating the traffic flows among tiers can be annotated with performance metrics. In the application intelligence model, there may not be any interaction among nodes within a single tier. Also, in some implementations, an application agent node cannot belong to more than one tier. Similarly, a machine agent cannot belong to more than one tier. However, more than one machine agent can be installed on a machine.

A backend is a component that participates in the processing of a business transaction instance. A backend is not instrumented by an agent. A backend may be a web server, database, message queue, or other type of service. The agent recognizes calls to these backend services from instrumented code (called exit calls). When a service is not instrumented and cannot continue the transaction context of the call, the agent determines that the service is a backend component. The agent picks up the transaction context at the response at the backend and continues to follow the context of the transaction from there.

Performance information is available for the backend call. For detailed transaction analysis for the leg of a transaction processed by the backend, the database, web service, or other application need to be instrumented.

The application intelligence platform uses both self-learned baselines and configurable thresholds to help identify application issues. A complex distributed application has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed application intelligence platform can perform anomaly detection based on dynamic baselines or thresholds.

The disclosed application intelligence platform automatically calculates dynamic baselines for the monitored metrics, defining what is "normal" for each metric based on actual usage. The application intelligence platform uses these baselines to identify subsequent metrics whose values fall out of this normal range. Static thresholds that are tedious to set up and, in rapidly changing application environments, error-prone, are no longer needed.

The disclosed application intelligence platform can use configurable thresholds to maintain service level agreements (SLAs) and ensure optimum performance levels for system by detecting slow, very slow, and stalled transactions. Configurable thresholds provide a flexible way to associate the right business context with a slow request to isolate the root cause.

In addition, health rules can be set up with conditions that use the dynamically generated baselines to trigger alerts or initiate other types of remedial actions when performance problems are occurring or may be about to occur.

For example, dynamic baselines can be used to automatically establish what is considered normal behavior for a particular application. Policies and health rules can be used against baselines or other health indicators for a particular application to detect and troubleshoot problems before users are affected. Health rules can be used to define metric conditions to monitor, such as when the "average response time is four times slower than the baseline". The health rules can be created and modified based on the monitored application environment.

Examples of health rules for testing business transaction performance can include business transaction response time and business transaction error rate. For example, health rule that tests whether the business transaction response time is much higher than normal can define a critical condition as the combination of an average response time greater than the default baseline by 3 standard deviations and a load greater than 50 calls per minute. In some implementations, this health rule can define a warning condition as the combination of an average response time greater than the default baseline by 2 standard deviations and a load greater than 100 calls per minute. In some implementations, the health rule that tests whether the business transaction error rate is much higher than normal can define a critical condition as the combination of an error rate greater than the default baseline by 3 standard deviations and an error rate greater than 10 errors per minute and a load greater than 50 calls per minute. In some implementations, this health rule can define a warning condition as the combination of an error rate greater than the default baseline by 2 standard deviations and an error rate greater than 5 errors per minute and a load greater than 50 calls per minute. These are non-exhaustive and non-limiting examples of health rules and other health rules can be defined as desired by the user.

Policies can be configured to trigger actions when a health rule is violated or when any event occurs. Triggered actions can include notifications, diagnostic actions, auto-scaling capacity, running remediation scripts.

Most of the metrics relate to the overall performance of the application or business transaction (e.g., load, average response time, error rate, etc.) or of the application server infrastructure (e.g., percentage CPU busy, percentage of memory used, etc.). The Metric Browser in the controller UI can be used to view all of the metrics that the agents report to the controller.

In addition, special metrics called information points can be created to report on how a given business (as opposed to a given application) is performing. For example, the performance of the total revenue for a certain product or set of products can be monitored. Also, information points can be used to report on how a given code is performing, for example how many times a specific method is called and how long it is taking to execute. Moreover, extensions that use the machine agent can be created to report user defined custom metrics. These custom metrics are base-lined and reported in the controller, just like the built-in metrics.

All metrics can be accessed programmatically using a Representational State Transfer (REST) API that returns either the JavaScript Object Notation (JSON) or the eXtensible Markup Language (XML) format. Also, the REST API can be used to query and manipulate the application environment.

Snapshots provide a detailed picture of a given application at a certain point in time. Snapshots usually include call graphs that allow that enables drilling down to the line of code that may be causing performance problems. The most common snapshots are transaction snapshots.

Figure 4:
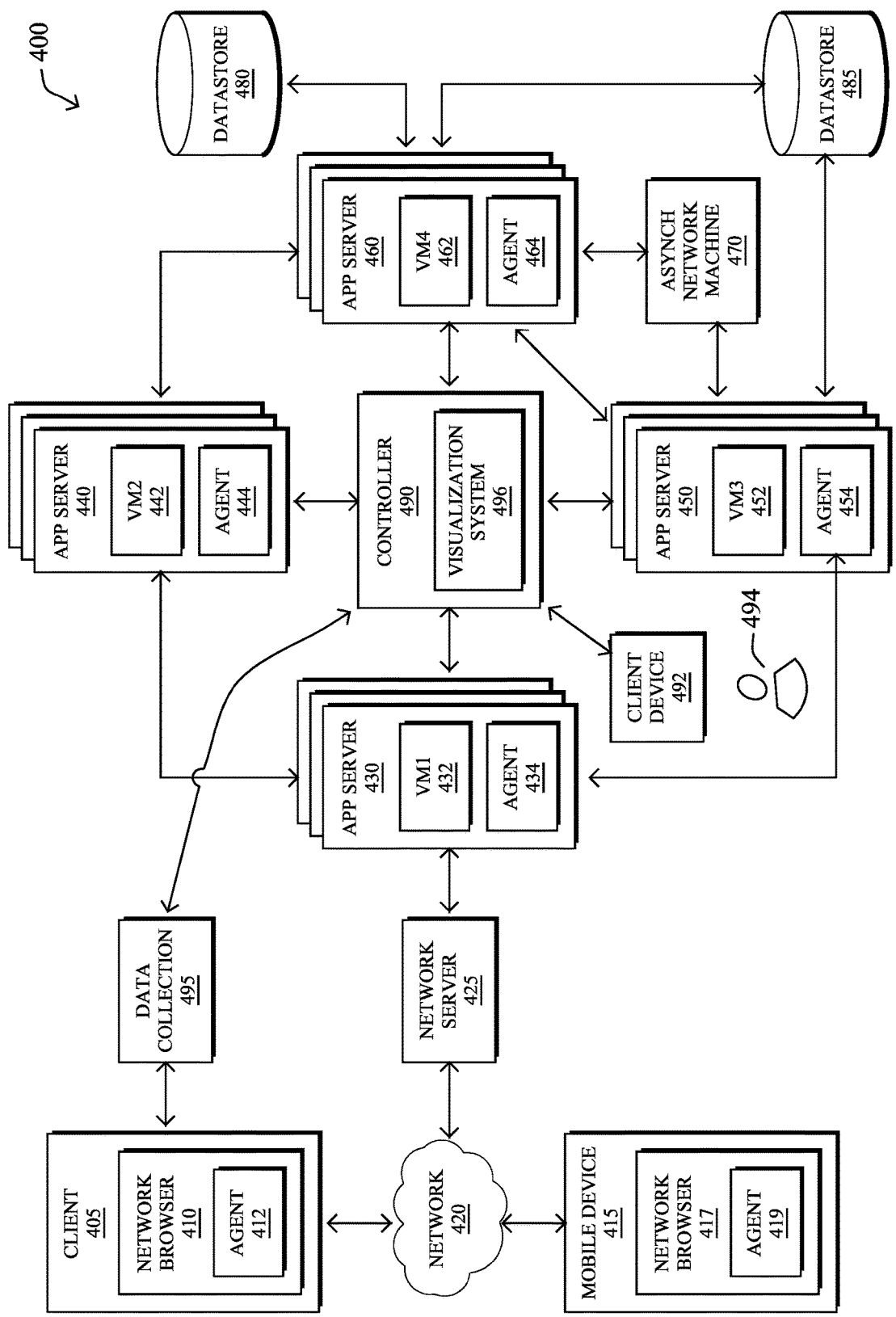
FIG. 4 illustrates an example system for implementing the example application intelligence platform.

FIG. 4 illustrates an example application intelligence platform (system) 400 for performing one or more aspects of the techniques herein. The system 400 in FIG. 4 includes client device 405 and 492, mobile device 415, network 420, network server 425, application servers 430, 440, 450, and 460, asynchronous network machine 470, data stores 480 and 485, controller 490, and data collection server 495. The controller 490 can include visualization system 496 for providing displaying of the report generated for performing the field name recommendations for field extraction as disclosed in the present disclosure. In some implementations, the visualization system 496 can be implemented in a separate machine (e.g., a server) different from the one hosting the controller 490.

Client device 405 may include network browser 410 and be implemented as a computing device, such as for example a laptop, desktop, workstation, or some other computing device. Network browser 410 may be a client application for viewing content provided by an application server, such as application server 430 via network server 425 over network 420.

Network browser 410 may include agent 412. Agent 412 may be installed on network browser 410 and/or client 405 as a network browser add-on, downloading the application to the server, or in some other manner. Agent 412 may be executed to monitor network browser 410, the operating system of client 405, and any other application, API, or another component of client 405. Agent 412 may determine network browser navigation timing metrics, access browser cookies, monitor code, and transmit data to data collection 495, controller 490, or another device. Agent 412 may perform other operations related to monitoring a request or a network at client 405 as discussed herein including report generating.

Mobile device 415 is connected to network 420 and may be implemented as a portable device suitable for sending and receiving content over a network, such as for example a mobile phone, smart phone, tablet computer, or other portable device. Both client device 405 and mobile device 415 may include hardware and/or software configured to access a web service provided by network server 425.

Mobile device 415 may include network browser 417 and an agent 419. Mobile device may also include client applications and other code that may be monitored by agent 419. Agent 419 may reside in and/or communicate with network browser 417, as well as communicate with other applications, an operating system, APIs and other hardware and software on mobile device 415. Agent 419 may have similar functionality as that described herein for agent 412 on client 405, and may report data to data collection server 495 and/or controller 490.

Network 420 may facilitate communication of data among different servers, devices and machines of system 400 (some connections shown with lines to network 420, some not shown). The network may be implemented as a private network, public network, intranet, the Internet, a cellular network, Wi-Fi network, VoIP network, or a combination of one or more of these networks. The network 420 may include one or more machines such as load balance machines and other machines.

Network server 425 is connected to network 420 and may receive and process requests received over network 420. Network server 425 may be implemented as one or more servers implementing a network service, and may be implemented on the same machine as application server 430 or one or more separate machines. When network 420 is the Internet, network server 425 may be implemented as a web server.

Application server 430 communicates with network server 425, application servers 440 and 450, and controller 490. Application server 450 may also communicate with other machines and devices (not illustrated in FIG. 4). Application server 430 may host an application or portions of a distributed application. The host application 432 may be in one of many platforms, such as including a Java, PHP, .Net, and Node.JS, be implemented as a Java virtual machine, or include some other host type. Application server 430 may also include one or more agents 434 (i.e., "modules"), including a language agent, machine agent, and network agent, and other software modules. Application server 430 may be implemented as one server or multiple servers as illustrated in FIG. 4.

Application 432 and other software on application server 430 may be instrumented using byte code insertion, or byte code instrumentation (BCI), to modify the object code of the application or other software. The instrumented object code may include code used to detect calls received by application 432, calls sent by application 432, and communicate with agent 434 during execution of the application. BCI may also be used to monitor one or more sockets of the application and/or application server in order to monitor the socket and capture packets coming over the socket.

In some embodiments, server 430 may include applications and/or code other than a virtual machine. For example, servers 430, 440, 450, and 460 may each include Java code, .Net code, PHP code, Ruby code, C code, C++ or other binary code to implement applications and process requests received from a remote source. References to a virtual machine with respect to an application server are intended to be for exemplary purposes only.

Agents 434 on application server 430 may be installed, downloaded, embedded, or otherwise provided on application server 430. For example, agents 434 may be provided in server 430 by instrumentation of object code, downloading the agents to the server, or in some other manner. Agent 434 may be executed to monitor application server 430, monitor code running in a virtual machine 432 (or other program language, such as a PHP, .Net, or C program), machine resources, network layer data, and communicate with byte instrumented code on application server 430 and one or more applications on application server 430.

Each of agents 434, 444, 454, and 464 may include one or more agents, such as language agents, machine agents, and network agents. A language agent may be a type of agent that is suitable to run on a particular host. Examples of language agents include a Java agent, .Net agent, PHP agent, and other agents. The machine agent may collect data from a particular machine on which it is installed. A network agent may capture network information, such as data collected from a socket.

Agent 434 may detect operations such as receiving calls and sending requests by application server 430, resource usage, and incoming packets. Agent 434 may receive data, process the data, for example by aggregating data into metrics, and transmit the data and/or metrics to controller 490. Agent 434 may perform other operations related to monitoring applications and application server 430 as discussed herein. For example, agent 434 may identify other applications, share business transaction data, aggregate detected runtime data, and other operations.

An agent may operate to monitor a node, tier of nodes, or other entity. A node may be a software program or a hardware component (e.g., memory, processor, and so on). A tier of nodes may include a plurality of nodes which may process a similar business transaction, may be located on the same server, may be associated with each other in some other way, or may not be associated with each other.

A language agent may be an agent suitable to instrument or modify, collect data from, and reside on a host. The host may be a Java, PHP, .Net, Node.JS, or other type of platform. Language agents may collect flow data as well as data associated with the execution of a particular application. The language agent may instrument the lowest level of the application to gather the flow data. The flow data may indicate which tier is communicating with which tier and on which port. In some instances, the flow data collected from the language agent includes a source IP, a source port, a destination IP, and a destination port. The language agent may report the application data and call chain data to a controller. The language agent may report the collected flow data associated with a particular application to a network agent.

A network agent may be a standalone agent that resides on the host and collects network flow group data. The network flow group data may include a source IP, destination port, destination IP, and protocol information for network flow received by an application on which network agent is installed. The network agent may collect data by intercepting and performing packet capture on packets coming in from one or more network interfaces (e.g., so that data generated/received by all the applications using sockets can be intercepted). The network agent may receive flow data from a language agent that is associated with applications to be monitored. For flows in the flow group data that match flow data provided by the language agent, the network agent rolls up the flow data to determine metrics such as TCP throughput, TCP loss, latency, and bandwidth. The network agent may then report the metrics, flow group data, and call chain data to a controller. The network agent may also make system calls at an application server to determine system information, such as for example a host status check, a network status check, socket status, and other information.

A machine agent, which may be referred to as an infrastructure agent, may reside on the host and collect information regarding the machine which implements the host. A machine agent may collect and generate metrics from information such as processor usage, memory usage, and other hardware information.

Each of the language agent, network agent, and machine agent may report data to the controller. Controller 490 may be implemented as a remote server that communicates with agents located on one or more servers or machines. The controller may receive metrics, call chain data and other data, correlate the received data as part of a distributed transaction, and report the correlated data in the context of a distributed application implemented by one or more monitored applications and occurring over one or more monitored networks. The controller may provide reports, one or more user interfaces, and other information for a user.

Agent 434 may create a request identifier for a request received by server 430 (for example, a request received by a client 405 or 415 associated with a user or another source). The request identifier may be sent to client 405 or mobile device 415, whichever device sent the request. In embodiments, the request identifier may be created when data is collected and analyzed for a particular business transaction.

Each of application servers 440, 450, and 460 may include an application and agents. Each application may run on the corresponding application server. Each of applications 442, 452, and 462 on application servers 440-460 may operate similarly to application 432 and perform at least a portion of a distributed business transaction. Agents 444, 454, and 464 may monitor applications 442-462, collect and process data at runtime, and communicate with controller 490. The applications 432, 442, 452, and 462 may communicate with each other as part of performing a distributed transaction. Each application may call any application or method of another virtual machine.

Asynchronous network machine 470 may engage in asynchronous communications with one or more application servers, such as application server 450 and 460. For example, application server 450 may transmit several calls or messages to an asynchronous network machine. Rather than communicate back to application server 450, the asynchronous network machine may process the messages and eventually provide a response, such as a processed message, to application server 460. Because there is no return message from the asynchronous network machine to application server 450, the communications among them are asynchronous.

Data stores 480 and 485 may each be accessed by application servers such as application server 460. Data store 485 may also be accessed by application server 450. Each of data stores 480 and 485 may store data, process data, and return queries received from an application server. Each of data stores 480 and 485 may or may not include an agent.

Controller 490 may control and manage monitoring of business transactions distributed over application servers 430-460. In some embodiments, controller 490 may receive application data, including data associated with monitoring client requests at client 405 and mobile device 415, from data collection server 495. In some embodiments, controller 490 may receive application monitoring data and network data from each of agents 412, 419, 434, 444, and 454 (also referred to herein as "application monitoring agents"). Controller 490 may associate portions of business transaction data, communicate with agents to configure collection of data, and provide performance data and reporting through an interface. The interface may be viewed as a web-based interface viewable by client device 492, which may be a mobile device, client device, or any other platform for viewing an interface provided by controller 490. In some embodiments, a client device 492 may directly communicate with controller 490 to view an interface for monitoring data.

Client device 492 may include any computing device, including a mobile device or a client computer such as a desktop, work station or other computing device. Client computer 492 may communicate with controller 490 to create and view a custom interface. In some embodiments, controller 490 provides an interface for creating and viewing the custom interface as a content page, e.g., a web page, which may be provided to and rendered through a network browser application on client device 492.

Applications 432, 442, 452, and 462 may be any of several types of applications. Examples of applications that may implement applications 432-462 include a Java, PHP, .Net, Node.JS, and other applications.

Figure 5:
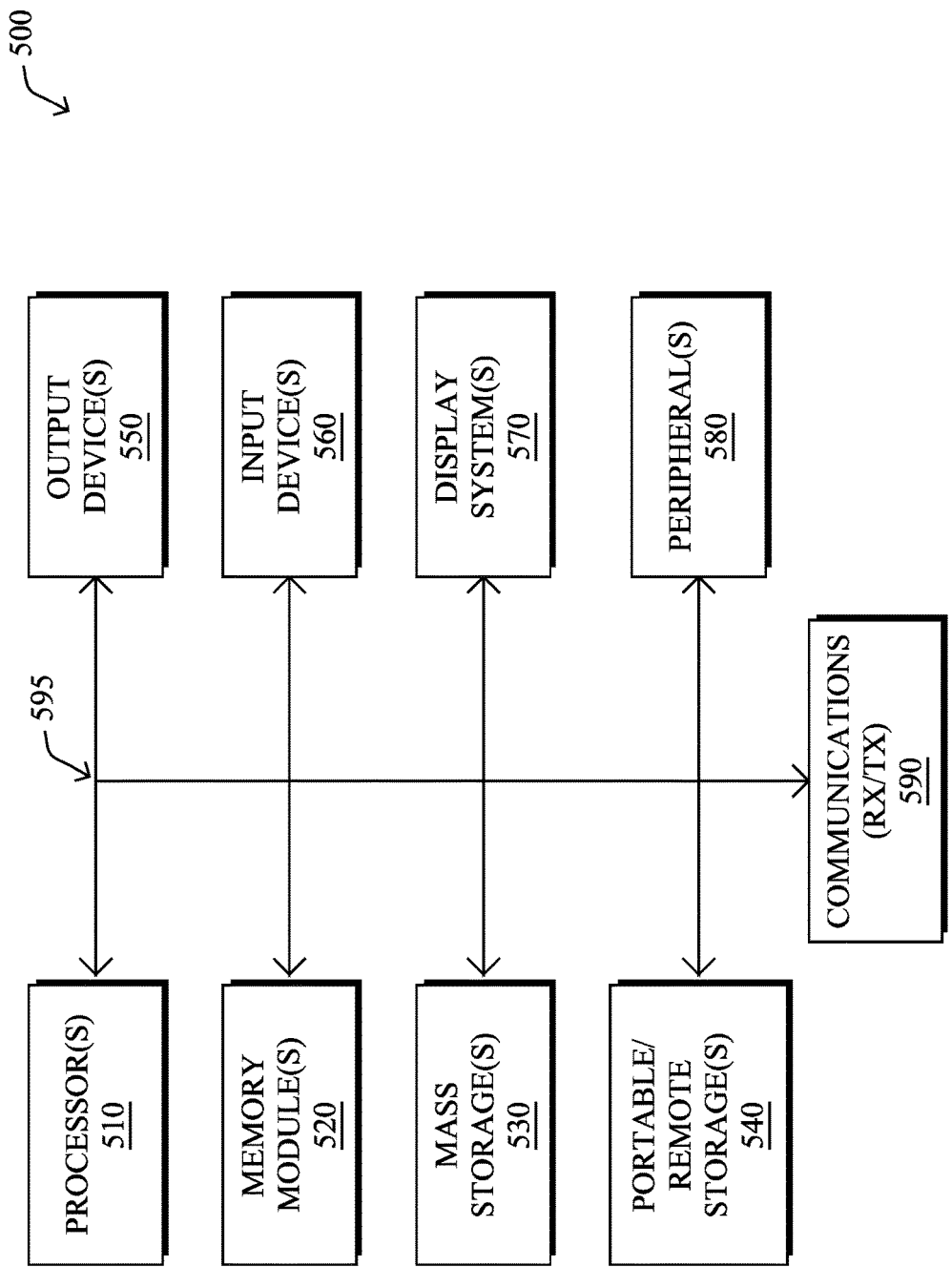
FIG. 5 illustrates another example computing system for implementing the disclosed technology.

FIG. 5 is a block diagram of a computer system 500 for implementing the present technology, which is a specific implementation of device 200 of FIG. 2 above. System 500 of FIG. 5 may be implemented in the contexts of the likes of clients 405, 492, network server 425, servers 430, 440, 450, 460, asynchronous network machine 470, and controller 490 of FIG. 4. (Note that the specifically configured system 500 of FIG. 5 and the customized device 200 of FIG. 2 are not meant to be mutually exclusive, and the techniques herein may be performed by any suitably configured computing device.)

The computing system 500 of FIG. 5 includes one or more processors 510 and memory 520. Main memory 520 stores, in part, instructions and data for execution by processor 510. Main memory 520 can store the executable code when in operation. The system 500 of FIG. 5 further includes a mass storage device 530, portable storage medium drive(s) 540, output devices 550, user input devices 560, a graphics display 570, and peripheral devices 580.

The components shown in FIG. 5 are depicted as being connected via a single bus 590. However, the components may be connected through one or more data transport means. For example, processor unit 510 and main memory 520 may be connected via a local microprocessor bus, and the mass storage device 530, peripheral device(s) 580, portable or remote storage device 540, and display system 570 may be connected via one or more input/output (I/O) buses.

Mass storage device 530, which may be implemented with a magnetic disk drive or an optical disk drive, is a non-volatile storage device for storing data and instructions for use by processor unit 510. Mass storage device 530 can store the system software for implementing embodiments of the present disclosure for purposes of loading that software into main memory 520.

Portable storage device 540 operates in conjunction with a portable non-volatile storage medium, such as a compact disk, digital video disk, magnetic disk, flash storage, etc. to input and output data and code to and from the computer system 500 of FIG. 5. The system software for implementing embodiments of the present disclosure may be stored on such a portable medium and input to the computer system 500 via the portable storage device 540.

Input devices 560 provide a portion of a user interface. Input devices 560 may include an alpha-numeric keypad, such as a keyboard, for inputting alpha-numeric and other information, or a pointing device, such as a mouse, a trackball, stylus, or cursor direction keys. Additionally, the system 500 as shown in FIG. 5 includes output devices 550. Examples of suitable output devices include speakers, printers, network interfaces, and monitors.

Display system 570 may include a liquid crystal display (LCD) or other suitable display device. Display system 570 receives textual and graphical information, and processes the information for output to the display device.

Peripherals 580 may include any type of computer support device to add additional functionality to the computer system. For example, peripheral device(s) 580 may include a modem or a router.

The components contained in the computer system 500 of FIG. 5 can include a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Apple OS, and other suitable operating systems, including mobile versions.

When implementing a mobile device such as smart phone or tablet computer, the computer system 500 of FIG. 5 may include one or more antennas, radios, and other circuitry for communicating over wireless signals, such as for example communication using Wi-Fi, cellular, or other wireless signals.

—Dynamic Policy Implementation for Application-Aware Routing based on Granular Business Insights—

As mentioned above, software-defined wide area networks (SD-WANs) represent the application of software-defined networking (SDN) principles to WAN connections, such as connections to cellular networks, the Internet, and Multiprotocol Label Switching (MPLS) networks. The power of SD-WAN is the ability to provide consistent service level agreement (SLA) for important application traffic transparently across various underlying tunnels of varying transport quality and allow for seamless tunnel selection based on tunnel performance characteristics that can match application SLAs.

In particular, with more and more workloads moving to the cloud, companies are looking at SD-WAN solutions to meet their application performance needs. Currently, these SD-WAN solutions make intelligent routing decisions by measuring and monitoring network performance over the hybrid WAN. However, current SD-WAN networking decisions (e.g., routing of packets, establishment of paths, etc.) lack application-based business context, which is important for enterprise architectures looking to SD-WAN solutions for optimal application performance. For instance, though current techniques gather some basic application insights from the application traffic flowing through the WAN, such as application type, class, etc., these solutions are not truly business aware/intelligent as they lack the depth and granularity of a company's business context and business needs.

As an example, assume an environment where a hospital enterprise has a number of hospital worksites with branch networks that may be connected to a central data center and a public cloud. At each hospital there may also be a plurality of kiosks for doctors and nurses to manage patients on a given application. Traditionally, network traffic related to the given application to and/or from the data center would all be routed in a similar manner (e.g., the same as any other network communication, or else with all traffic for the application being treated at a higher level of service). Now assume, however, that the hospital wishes to treat network traffic of the application for critical patients differently than non-critical patients (e.g., treating critical care applications with higher priority, lower latency, etc. than routine care applications). Current policies and SD-WAN management techniques do not provide such granularity, neither in terms of application visibility nor underlying network control.

The techniques herein, therefore, provide for an advanced level of integration between application monitoring and awareness and SD-WAN management, whereby the techniques, described in greater detail below, are able to capture a company's critical business need using the application intelligence platform above, and can then apply network policies in an SD-WAN on-the-fly to provide a better application experience for users.

Specifically, according to one or more embodiments described herein, a process (e.g., application intelligence platform's application aware routing process 248) captures one or more features of an initiated application transaction within an application, and applies the one or more features to one or more application-based policies. In response to determining a policy trigger for the initiated application transaction based on applying the one or more features to the one or more application-based policies, the process may then obtain a network address associated with the application. Once the process maps the particular policy trigger from the one or more application-based policies to one or more corresponding network-based policies, then the process can instruct a network controller (e.g., SD-WAN controller) to apply the one or more corresponding network-based policies to the network address associated with the application, causing the network controller to configure a computer network to manage network traffic associated with the network address according to the one or more corresponding network-based policies.

Operationally, and as described further below, an "Application-Aware Routing" Extension (e.g., process 248) is built that can capture business intelligence/application features from applications (e.g., Business Transactions and other related information), obtain an IP address associated with the application associated with a given feature (e.g., a particular BT), and can assist in applying network policies based on the IP address (and thus based on the granular application feature) on-demand, such as through integration with an SD-WAN management system. In particular, IP address records are extracted from an "Events Service" (e.g., from their string value to an IP address readable by the SD-WAN routing processes). Also, in order to create a policy or health rule that might be used to trigger an HTTP request (e.g., to a third party REST API), a numeric metric may be needed for the criteria of the health rule. Furthermore, the techniques herein track the IP addresses (e.g., by the extension process 248) so that no duplicate instructions are sent to the third party REST API (which requires logic that goes beyond currently available capabilities).

Notably, web pages (and/or applications) may be monitored using various types of Browser Real User Monitoring (BRUM) products or alternatively End User Monitoring (EUM) products (e.g., agents, as described above), which report performance data about the page and its resources, such as JavaScripts (JS), Stylesheets (CSS), images, etc. In particular, Java Script Agents ("JSAgents"), as mentioned above, may be configured to collect and reports performance data about web pages and their resources, such as JS, CSS, images, etc.

Figure 6:
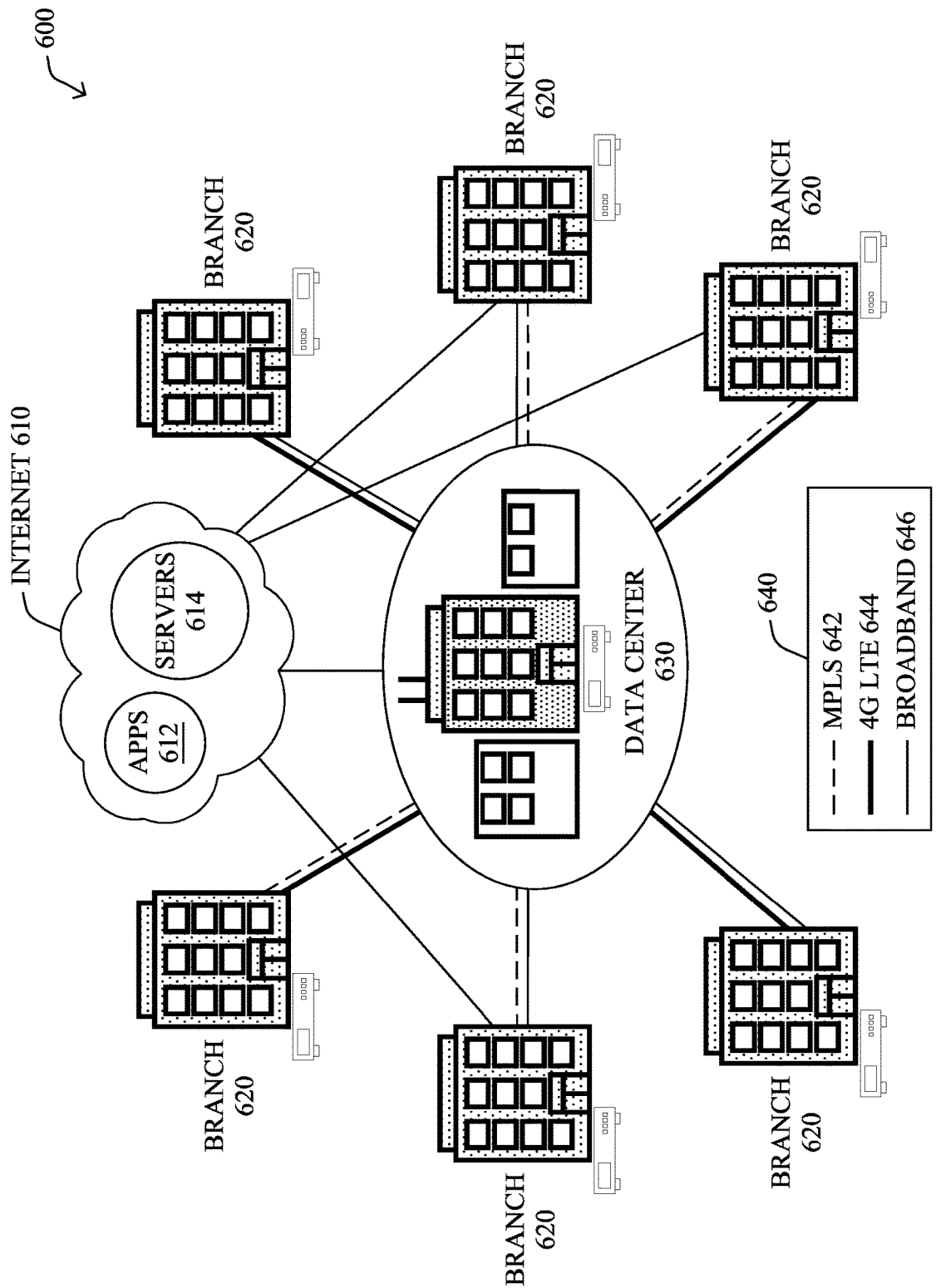
FIG. 6 illustrates an example of a software-defined wide area network (SD-WAN) architecture for intent-based routing.

FIG. 6 illustrates an example of an SD-WAN architecture 600 (e.g., for intent-based routing), wherein various branches 620 of an enterprise may be connected to a data center 630 and public internet/cloud 610 (e.g., with apps 612, servers 614, etc.) through various network connections 640, such as MPLS 642, 4G LTE 644, Broadband 646, and so on.

The techniques herein bridge application intelligence with SD-WAN management such that the underlying network policies can be driven by business policies. By using the application intelligence platform described above, the techniques herein can capture the true business intent by capturing a business transaction and can then apply certain network policies in the SD-WAN to achieve better quality of service (QoS).

Figure 7:
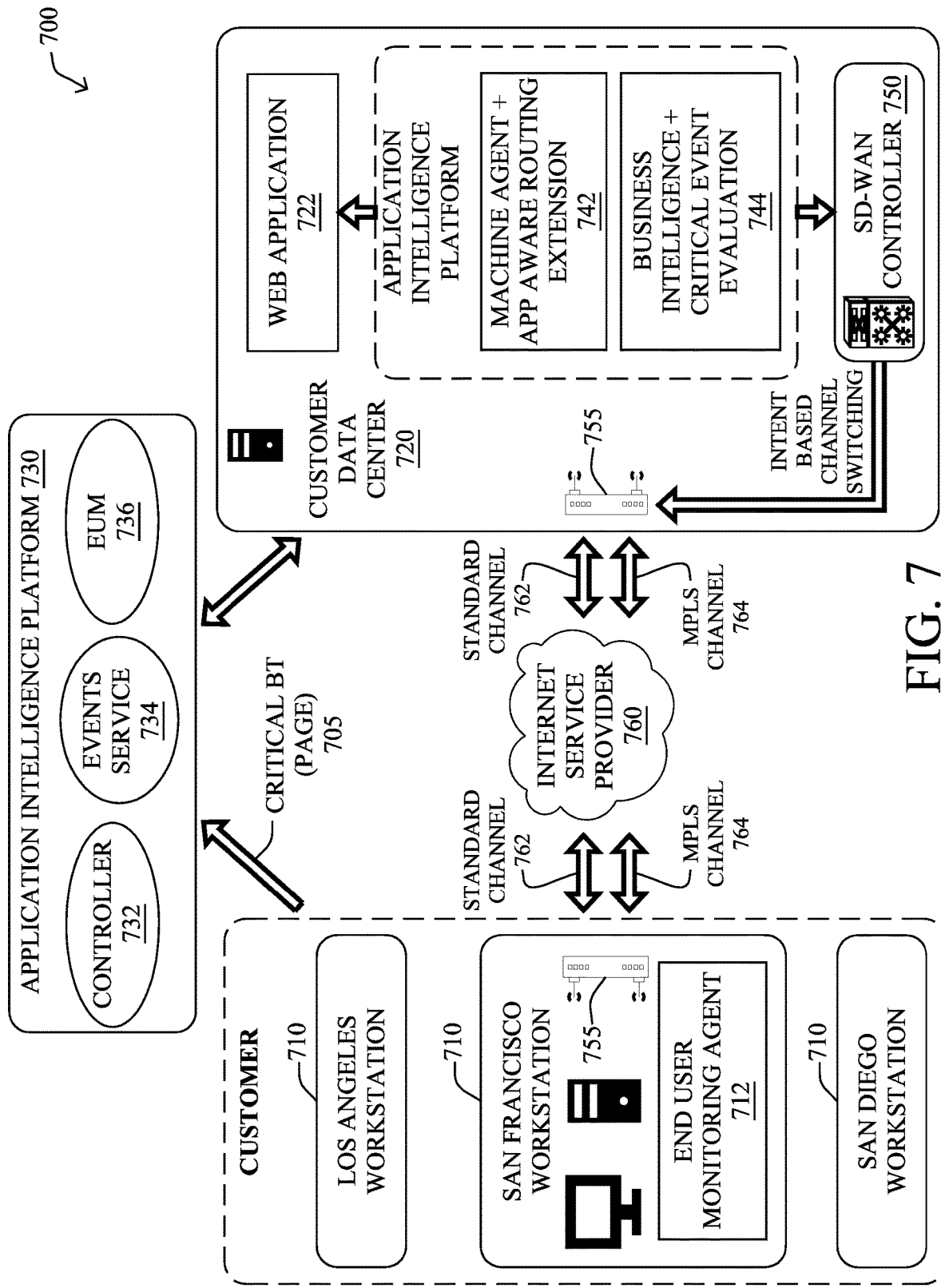
FIG. 7 illustrates an example system for dynamic policy implementation for application-aware routing based on granular business insights.

In particular, FIG. 7 illustrates an example system 700 for dynamic policy implementation for application-aware routing based on granular business insights according to one or more embodiments herein. As shown, there are several customer workstations 710 (e.g., hospital locations). Assume, for example, that a user sends a page or emergency data to doctors, and the doctors can access this data via a web application 722 hosted on their data center 720. The illustrative San Francisco workstation is instrumented by the application intelligence platform's EUM agent 712, which captures critical business transactions 705. This data is then sent to the application intelligence platform 730 (e.g., with a corresponding controller 732, events service 734, and EUM component 736).

The Web Application 722 is instrumented by the Application-Aware Routing Extension 742 (e.g., a portion of the application intelligence platform 730 implemented within the customer data center 720), which pulls this data from the application intelligence platform and evaluates configured business rules via business intelligence and critical event evaluation component 744. Once a critical event is found (e.g., logging into a critical application), the extension communicates with the SD-WAN controller 750, which in turn switches all traffic (e.g., via network devices 755, such as routers, switches, etc.) between the workstation and data center to a better (e.g., faster) channel across the internet service provider 760 (e.g., from the standard channel 762 to the MPLS channel 764), thereby using Business Intelligence to manipulate network traffic. A future event (e.g., logging out of the critical application) would then cancel the use of the faster (or otherwise "better") channel, accordingly.

Various types of business intelligence policies may be defined (e.g., statically by a user or dynamically based on various machine learning or artificial intelligence algorithms). For example, individual business features (e.g., a first type of BT versus a second or third type of BT) may be associated with different IP-based routing policies (e.g., routing the first type of BT through a better channel than the second type, and the second type better than the third type, and so on). Any business feature policy may be established, and the associated IP address of the application/device participating in that business feature may be extracted and managed at the IP-level according to the techniques herein, accordingly.

Figure 8:
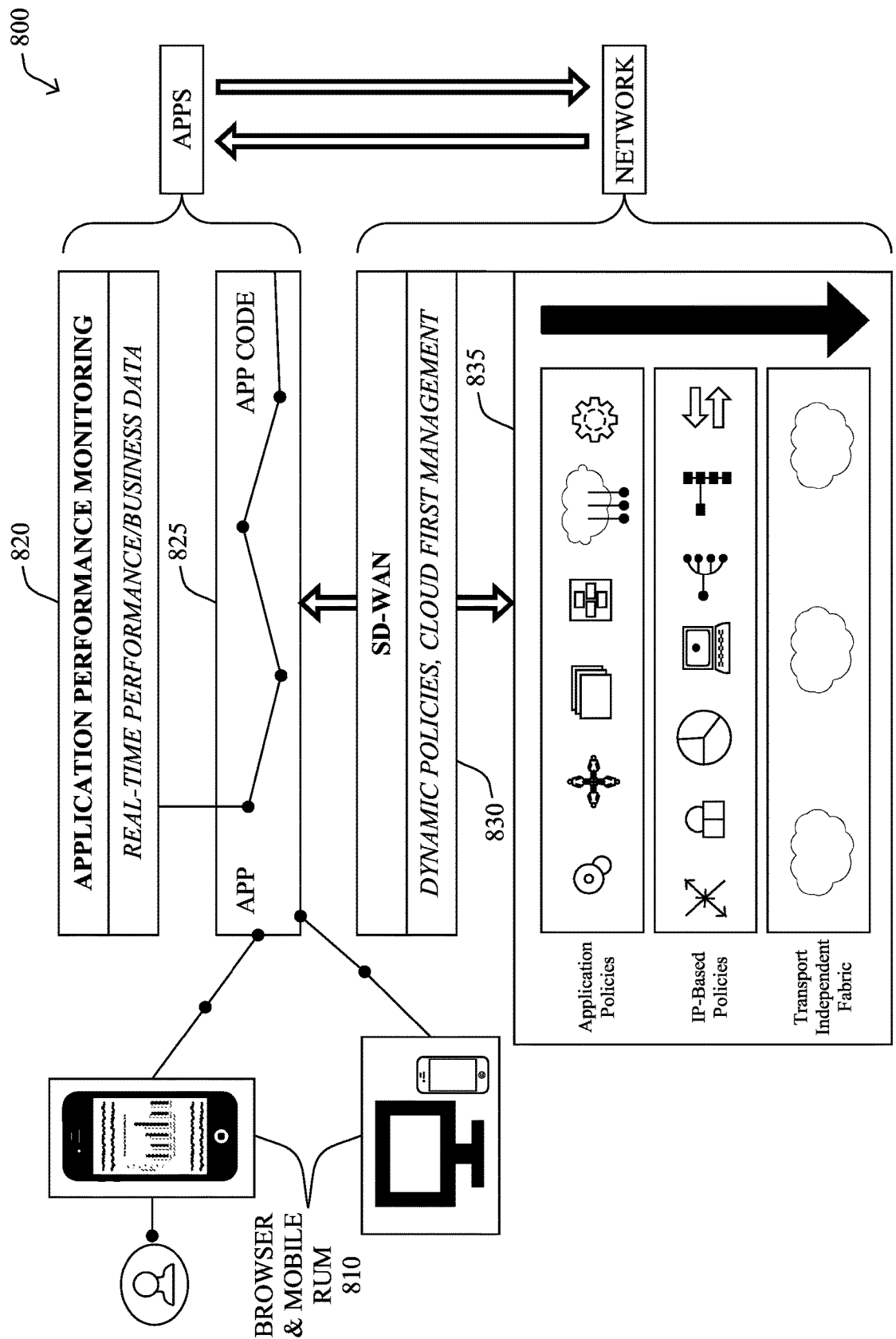
FIG. 8 illustrates another example system for dynamic policy implementation for application-aware routing based on granular business insights.

FIG. 8 illustrates another example system 800 for dynamic policy implementation for application-aware routing based on granular business insights. Namely, a user's mobile application 810 may be monitored (application performance monitoring 820 consuming application data 825), where again SD-WAN policies 830 may be implemented based on correlating application/business transaction triggers to the user's IP address for implementing the IP-based policies 835. In this manner, proactive actions can be taken to provide better customer experiences, particularly impacting critical applications and business transactions according to the techniques herein.

According to one or more embodiments of the techniques herein, the application-aware routing extension is capable of the following features, particularly for each specific browser-based application that is monitored with a BRUM/EUM. First, the techniques herein can detect each unique browser client request that makes a successful login request and subsequent log out request, based on the browser client IP Address and the URL pattern of the login and log out request. In addition, the techniques herein can detect each unique browser client that participates in "Enable Business Transaction" (EnableBT) (e.g., login-BT) and subsequent "Disable Business Transaction" (DisableBT) (e.g., logout-BT) using browser client IP Address). Furthermore, the techniques herein may send a JSON (option to send XML) record over HTTP/HTTPS for each unique successful browser client login request (e.g., EnableBT request) and subsequent log out request (e.g., DisableBT request), to a configured REST endpoint. Note that the external REST endpoint receiving the JSON/XML record may take the browser client IP Address (included with other data in the JSON/XML record) and when associated with a login request (e.g., EnableBT), route the future requests for that IP Address to a different network, presumably with higher throughput, and then upon receipt of a log out JSON/HTML record (e.g., DisableBT) for the same IP Address, switch the same IP Address back to the prior network route (hence, "Business Transaction Aware Routing").

According to the techniques herein, the extension should not send duplicate records (e.g., make REST API calls for duplicate records) for a unique IP Address for the same request type (e.g., the same BT type), only one record when a unique IP Address makes a login request (e.g., EnableBT request) and only one record when a unique IP Address makes a log out request (i.e. the extension must determine and track the beginning and end of a session for each unique IP Address). Also, the extension should send only one JSON/XML record in each HTTP/HTTPS request to the third party REST endpoint.

Also, according to the techniques herein, the routing extension may cause the application intelligence platform Machine Agent to run and read its configuration from a monitor.xml file (though the code could be migrated to work outside the machine agent), and may not require the Machine Agent to be associated with any other application intelligence platform component. (In one embodiment, the extension may also maintain a config.yaml file, within which may reside configurations related to controllers, event services, etc.) Furthermore, according to the techniques herein, the application-aware routing extension may be configured (e.g., defined in a corresponding monitor.xml file) such that the browser based application is instrumented with the application intelligence platform Browser EUM JavaScript agent and is reporting data to the EUM Server, and that the "Store IP Address" setting is set to true within the configuration for the same browser application (Browser Request IP Address Storage)—optionally via APIs during startup. In addition, the configuration may be set such that the same browser application has the application intelligence platform Browser EUM Analytics enabled and is reporting data to the Events Service—optionally via APIs during startup, and further such that the application intelligence platform Machine Agent running the extension can connect to the appropriate Events Service and to the third party REST endpoint. Note that a configurable URL for both the login and log out request should be configured to be unique enough to mark the beginning and end of a user's browser application session.

Figure 9:
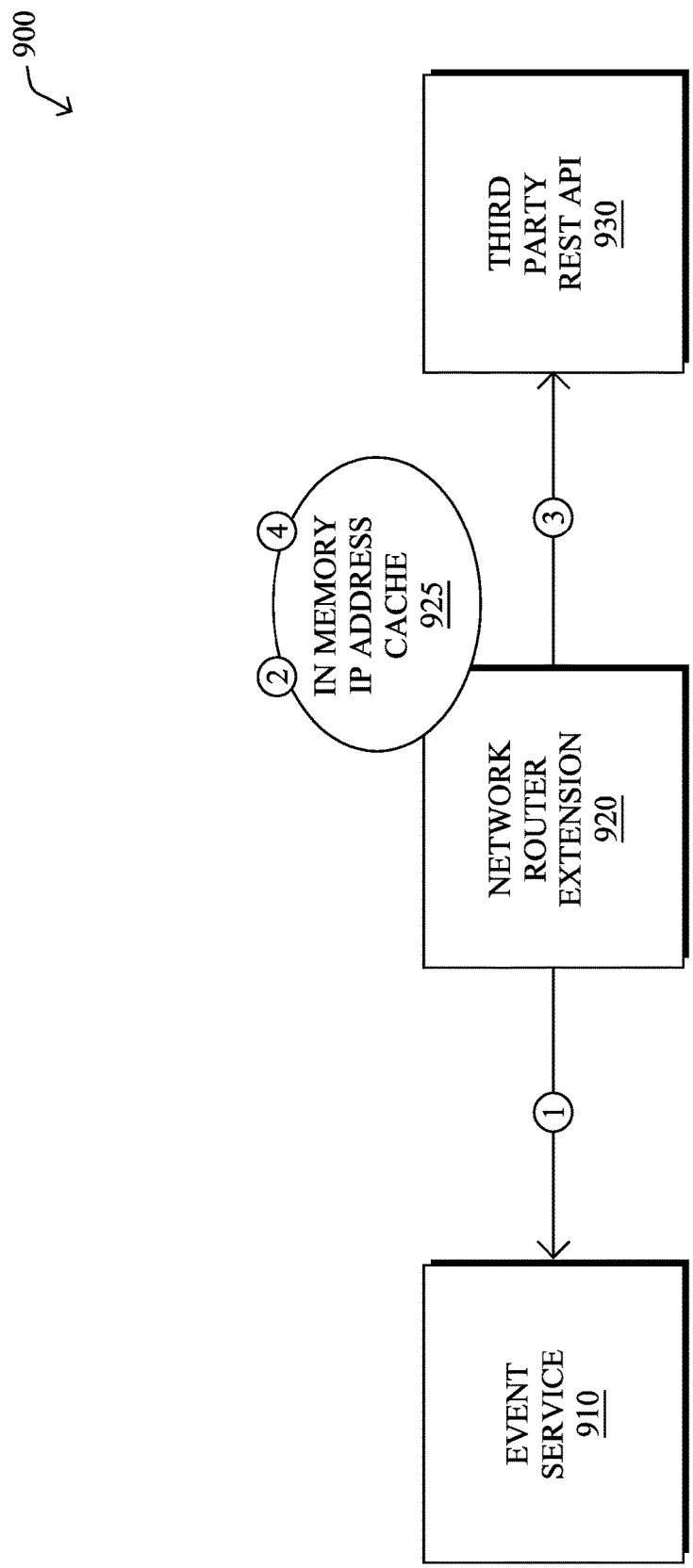
FIG. 9 illustrates an example of a process that may be used for dynamic policy implementation for application-aware routing based on granular business insights.

As shown in FIG. 9, for example, an illustrative system 900 herein (network router extension 920) (1) queries the browser_records schema in the events service 910 periodically (e.g., once a minute) with the EUM app key and events service API key to find new IP addresses that have triggered an event (e.g., logged in or out). Next (2), the query results of IP addresses are checked and compared against the cache 925, identifying IP addresses to send to third party REST API 930. At that time (3), new IP addresses that are associated with a triggered event (e.g., that have logged in and/or logged out) are sent to the third part REST API over HTTP/HTTPS. Then (4), the system updates the cache 925 to account for the new IP addresses sent to third party REST API 930.

Said differently, to obtain an IP address that corresponds to a particular business transaction/feature trigger, the techniques herein may use a javascript agent associated with a browser Real User Monitoring (BRUM/EUM) process to extract an end host's IP address, and may send that IP address to event services of the application intelligence platform (along with the business feature/trigger). Periodically (e.g., every second or few seconds), the extension herein looks at the business features (e.g., BTID) for rules-based triggers, and then sends the associated IP addresses to the SD-WAN management controller for implementation of one or more network policies. In particular, according to the techniques herein, the application-aware routing extension prevents resending the same IP address again to the SD-WAN management until a change is needed in the implemented policies (e.g., a log off event or other trigger). This is made possible through state management (e.g., state machines) within the application-aware routing extension process to maintain the state of each shared IP address, including when failures or outages occur, such that only in response to a triggered state change do the IP addresses get shared with the SD-WAN controller.

Figure 10A:
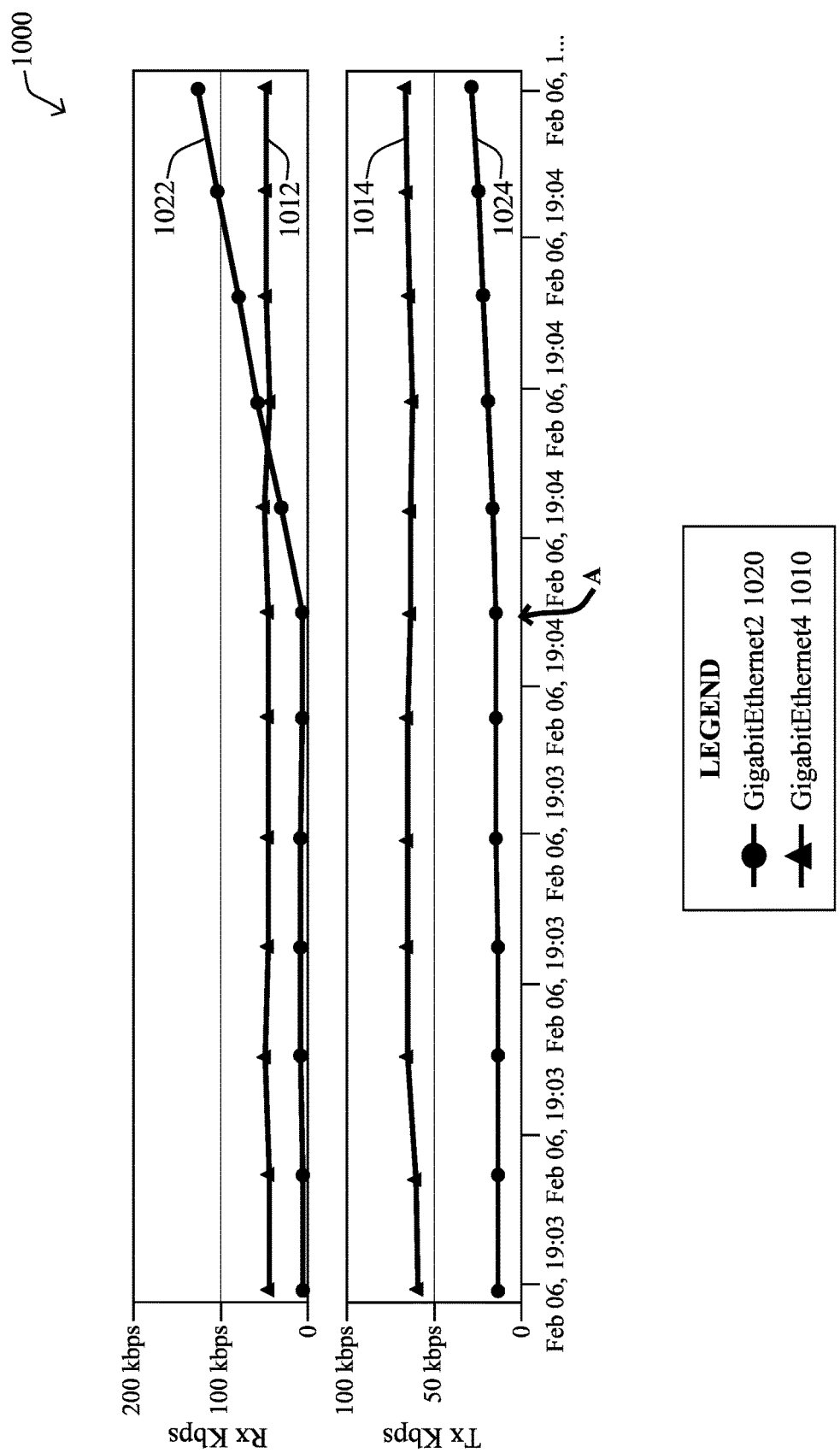
FIGS. 10A-10B illustrate an example chart of channel utilization (standard and critical) based on dynamic policy implementation for application-aware routing based on granular business insights.
Figure 10B:
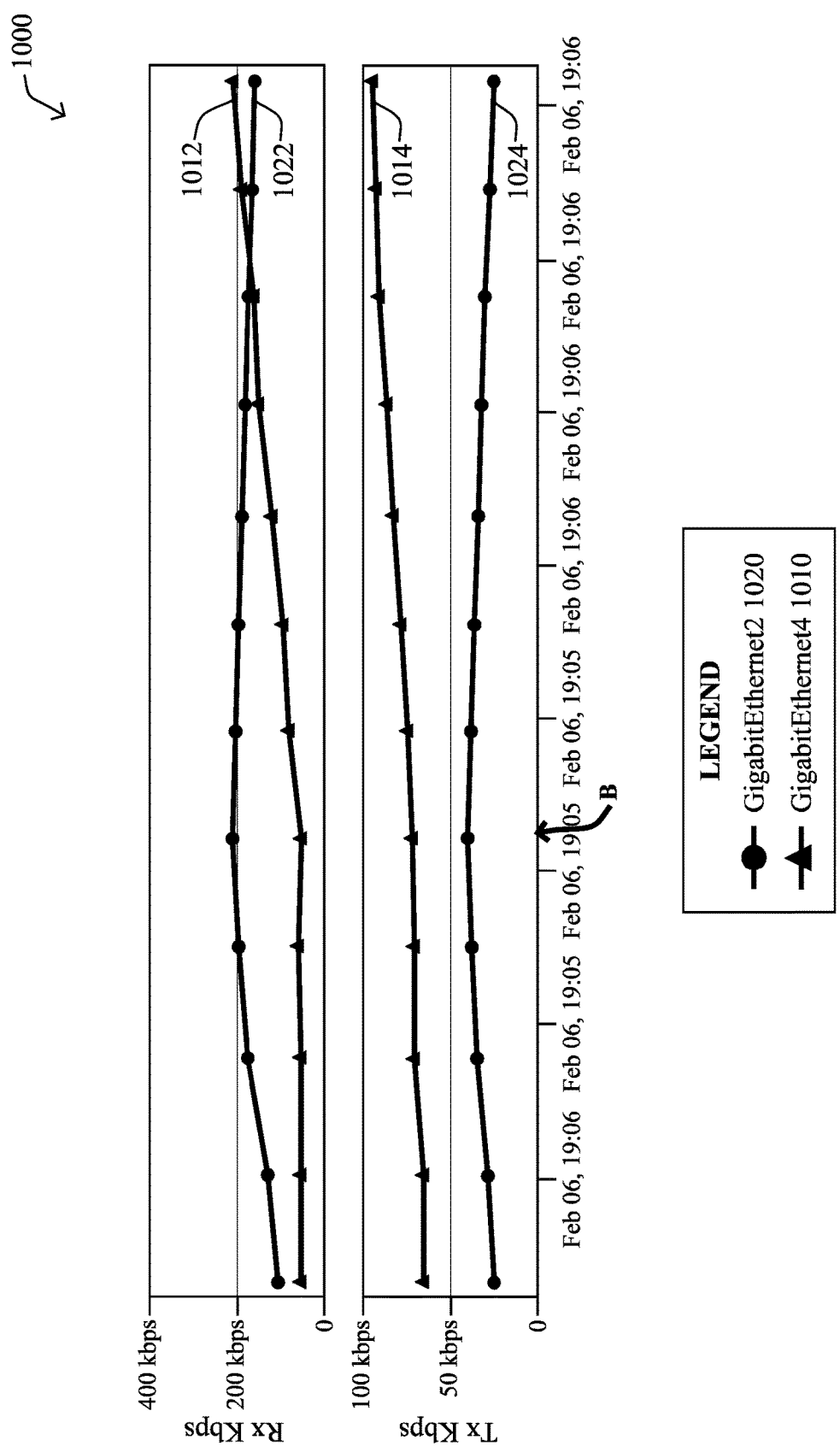

FIG. 10A illustrates an example graph 1000 of monitored traffic rates over time based on the techniques herein being implemented. For instance, the "triangle" line 1010 (shown as GigabitEthernet4) plots the usage of a standard channel (receive/Rx 1012 and transmit/Tx 1014), e.g., for traffic not accessing critical data (e.g., critical patients). Assume, however, that at time "A" a business intelligence trigger is detected (e.g., a specific log in activity, such as a doctor logging into a critical patient's account), causing implementation of a given application-aware policy. As such, the "circle" line 1020 (shown as GigabitEthernet2), indicative of a critical channel usage (e.g., an MPLS channel), begins to show increased traffic flow (e.g., for both transmit/Tx 1024 and receive/Rx 1022). As shown in FIG. 10B, on the other hand, another trigger may be detected at time "B" (e.g., a log off event) that results in the critical traffic on critical channel being reduced over time based on the changed policy. (Notably, the changes may be immediate, gradual, and so on.)

According to the techniques herein, the application-aware routing extension provides more context about business-related features to SD-WAN management, particularly by correlating those business-related features to IP addresses that can have network policies applied thereto, based on user-defined policies and rules. The rules themselves can be very flexible, where business intelligence features (e.g., business transaction or BTIDs) can be used to define policies that until now had not been possible. That is, the techniques herein provide for IP-address-based routing in an SD-WAN (managed in an IP space) that is triggered by BT-based policies (managed in an application intelligence space).

Figure 11:
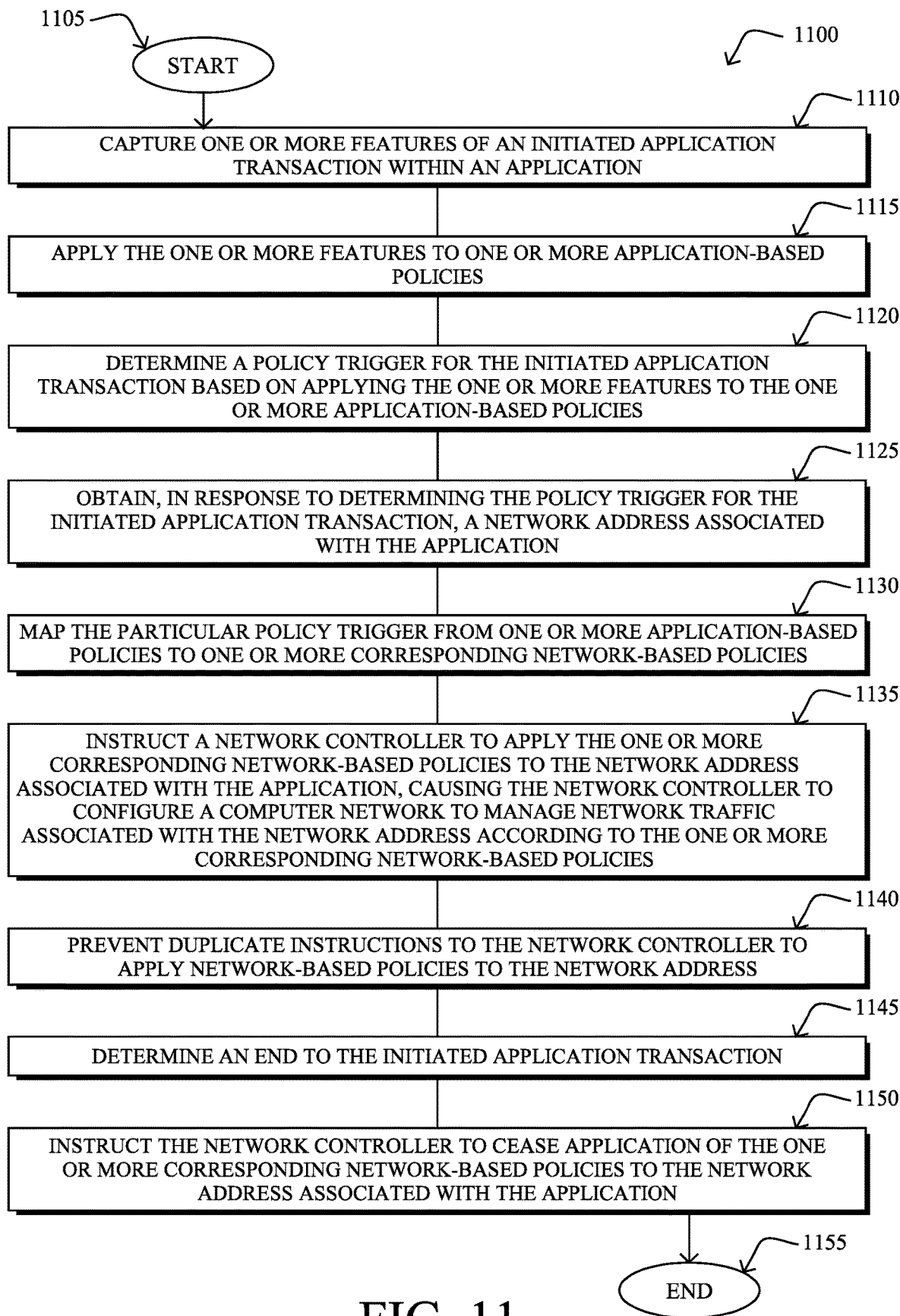
FIG. 11 illustrates an example simplified procedure for dynamic policy implementation for application-aware routing based on granular business insights.

In closing, FIG. 11 illustrates an example simplified procedure for dynamic policy implementation for application-aware routing based on granular business insights in accordance with one or more embodiments described herein. For example, a non-generic, specifically configured device (e.g., device 200, particularly an application intelligence platform device) may perform procedure 1100 by executing stored instructions (e.g., process 248, such as an application aware routing process). The procedure 1100 may start at step 1105, and continues to step 1110, where, as described in greater detail above, one or more features of an initiated application transaction within an application (e.g., a log-in/on event) are captured (e.g., by monitoring the application through one or more user application monitoring agents). For example, the one or more features may comprise a transaction type, a BTID, an application identifier, a user identifier, a user group identifier, and so on. In step 1115, the process may then apply the one or more features to one or more application-based policies to determine, in step 1120, whether a policy trigger exists for the initiated application transaction based on applying the one or more features to the one or more application-based policies. For instance, the application-based policies may correspond to setting different levels of priority, different QoS, and so on based on the features.

In step 1125, in response to determining the policy trigger for the initiated application transaction, the process then obtains a network address associated with the application (e.g., extracting the network address by converting a string value from an events service associated with the application into an Internet Protocol (IP) address). In addition, in step 1130, the process maps the particular policy trigger from the one or more application-based policies to one or more corresponding network-based policies. For instance, when the policy trigger for the initiated application transaction comprises application-based priority, then mapping the particular policy trigger from the one or more application-based policies to the one or more corresponding network-based policies may comprise mapping the application-based priority to a corresponding network-based priority. Note also that as described above, the one or more corresponding network-based policies may be created by converting one or more criteria of the one or more application-based policies into one or more numeric network metrics for the one or more corresponding network-based policies.

In step 1135, the process can now instruct a network controller (e.g., SD-WAN controller) to apply the one or more corresponding network-based policies to the network address associated with the application, causing the network controller to configure a computer network to manage network traffic associated with the network address according to the one or more corresponding network-based policies. Note that in one embodiment, the network controller may also be instructed of the one or more corresponding network-based policies to apply to the network address (e.g., informing the controller of exactly what the policy is on-the-fly), while in another embodiment, the network controller may be instructed to apply one or more pre-configured corresponding network-based policies to the network address.

According to further embodiments of the techniques herein, in step 1140 the process may prevent duplicate instructions to the network controller to apply network-based policies to the network address, as described above.

Upon determining an end to the initiated application transaction in step 1145, then in step 1150, in response to the end of the initiated application transaction, the process may instruct the network controller to cease application of the one or more corresponding network-based policies to the network address associated with the application (e.g., a log-off/out event).

The simplified procedure 1100 may then end in step 1155, notably with the ability to continue capturing application features and applying policies, accordingly. Other steps may also be included generally within procedure 1100.

It should be noted that while certain steps within procedure 1100 may be optional as described above, the steps shown in FIG. 11 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for dynamic policy implementation for application-aware routing based on granular business insights. In particular, the techniques herein provide for differentiated managed SD-WAN services for Internet service providers (ISPs) that are more intelligent than standard SD-WAN management. For instance, an ISP can now provide the application integration services described above to customers in order to give customer-defined critical application traffic a better treatment through the network, resulting in a better overall user experience. Customers, on the other hand, can now have finer-grained control over application-based policies that can be easily changed and applied, and implemented on-demand based on changing traffic conditions and/or triggers. Note further that the techniques herein can also provide for AIOPS (Artificial Intelligence for IT Operations) use cases, such as, for example, responding to a network failure with automatically applying network policies to route critical business transactions through a 4G LTE channel.

Notably, there are many application-aware network use cases that may advantageously make use of the techniques herein. For example, critical users/groups of users (e.g., Platinum/Gold Customers, customers at premium lounge kiosks at airports/hotels, etc.) may receive proactively provided higher QoS to their traffic based on baselines for critical users (e.g., granular control on users on a per location and application for key users). Also, critical applications/business transactions (e.g., high dollar value trades from a bank branch, total orders and average order size trends, conversion rate on sale days, end of day production data upload on oil rigs, and so on) may obtain value from the techniques herein due to further cost reduction on top of SD-WAN solutions by predictive business metrics driven automated network configuration (e.g., working to reduce bottlenecks before they occur or resolving them quickly for key transactions and applications). Business events/metrics, too (e.g., average hourly transaction processing time for a store and customer critical transactions, jumbo loan processing time for bank branches, average hourly order size trends on new product sales per branch, and so on) may now be used for granular and predictive network changes led by business level metrics providing highly flexible solution (i.e., automated policy driven network changes). Lastly, value is provided for customer end points (e.g., predictable device performance for key devices such as kiosks on oil-rigs or IOT sensors on field sites, etc.) in that device-by-device and app-level data for real-time app behavior impact provides better service level (SL) management at the network level.

In still further embodiments of the techniques herein, a business impact of dynamic policy implementation for application-aware routing based on granular business insights can also be quantified. That is, because of issues related to specific applications/processes (e.g., lost traffic, slower servers, overloaded network links, etc.) affecting network metrics, and vise versa, various corresponding business transactions may have been correspondingly affected for those applications/processes (e.g., online purchases were delayed, page visits were halted before fully loading, user satisfaction or dwell time decreased, etc.), while other processes (e.g., on other network segments or at other times) remain unaffected. The techniques herein, therefore, can correlate the effects of dynamic policy implementation for application-aware routing based on granular business insights with various business transactions in order to better understand the affect such implementation may have had on the business transactions, accordingly.

Illustratively, the techniques described herein may be performed by hardware, software, and/or firmware, such as in accordance with the illustrative application-aware routing (e.g., extension) process 248, which may include computer executable instructions executed by the processor 220 to perform functions relating to the techniques described herein, e.g., in conjunction with corresponding processes of other devices in the computer network as described herein (e.g., on network agents, controllers, computing devices, servers, etc.). Notably, the extension is configured to work when the application intelligence platform controller, EUM Server, and Events Service is deployed on-premise or in an application intelligence platform SaaS environment.

According to the embodiments herein, a method herein may comprise: capturing, by a process, one or more features of an initiated application transaction within an application; applying, by the process, the one or more features to one or more application-based policies; determining, by the process, a policy trigger for the initiated application transaction based on applying the one or more features to the one or more application-based policies; obtaining, by the process in response to determining the policy trigger for the initiated application transaction, a network address associated with the application; mapping, by the process, the particular policy trigger from the one or more application-based policies to one or more corresponding network-based policies; and instructing, by the process, a network controller to apply the one or more corresponding network-based policies to the network address associated with the application, causing the network controller to configure a computer network to manage network traffic associated with the network address according to the one or more corresponding network-based policies.

In one embodiment, the network controller comprises a software-defined wide area network (SD-WAN) controller. In one embodiment, the one or more features comprise a transaction type. In one embodiment, the policy trigger for the initiated application transaction comprises application-based priority, and wherein mapping the particular policy trigger from the one or more application-based policies to the one or more corresponding network-based policies comprises mapping the application-based priority to a corresponding network-based priority. In one embodiment, the method further comprises preventing duplicate instructions to the network controller to apply network-based policies to the network address. In one embodiment, the method further comprises determining an end to the initiated application transaction, and instructing, in response to the end of the initiated application transaction, the network controller to cease application of the one or more corresponding network-based policies to the network address associated with the application. In one embodiment, the method further comprises instructing the network controller of the one or more corresponding network-based policies to apply to the network address. In one embodiment, the method further comprises instructing the network controller to apply one or more pre-configured corresponding network-based policies to the network address. In one embodiment, obtaining the network address comprises extracting the network address by converting a string value from an events service associated with the application into an Internet Protocol (IP) address. In one embodiment, the method further comprises creating the one or more corresponding network-based policies by converting one or more criteria of the one or more application-based policies into one or more numeric network metrics for the one or more corresponding network-based policies. In one embodiment, the method further comprises monitoring the application through one or more user application monitoring agents.

According to the embodiments herein, a tangible, non-transitory, computer-readable medium herein may have computer-executable instructions stored thereon that, when executed by a processor on a computer, may cause the computer to perform a method comprising: capturing one or more features of an initiated application transaction within an application; applying the one or more features to one or more application-based policies; determining a policy trigger for the initiated application transaction based on applying the one or more features to the one or more application-based policies; obtaining, in response to determining the policy trigger for the initiated application transaction, a network address associated with the application; mapping the particular policy trigger from the one or more application-based policies to one or more corresponding network-based policies; and instructing a network controller to apply the one or more corresponding network-based policies to the network address associated with the application, causing the network controller to configure a computer network to manage network traffic associated with the network address according to the one or more corresponding network-based policies.

Further, according to the embodiments herein an apparatus herein may comprise: one or more network interfaces to communicate with a network; a processor coupled to the network interfaces and configured to execute one or more processes; and a memory configured to store a process executable by the processor, the process, when executed, configured to: capture one or more features of an initiated application transaction within an application; apply the one or more features to one or more application-based policies; determine a policy trigger for the initiated application transaction based on applying the one or more features to the one or more application-based policies; obtain, in response to determining the policy trigger for the initiated application transaction, a network address associated with the application; map the particular policy trigger from the one or more application-based policies to one or more corresponding network-based policies; and instruct a network controller to apply the one or more corresponding network-based policies to the network address associated with the application, causing the network controller to configure a computer network to manage network traffic associated with the network address according to the one or more corresponding network-based policies.

While there have been shown and described illustrative embodiments above, it is to be understood that various other adaptations and modifications may be made within the scope of the embodiments herein. For example, while certain embodiments are described herein with respect to certain types of networks in particular, the techniques are not limited as such and may be used with any computer network, generally, in other embodiments. Moreover, while specific technologies, protocols, and associated devices have been shown, such as Java, TCP, IP, and so on, other suitable technologies, protocols, and associated devices may be used in accordance with the techniques described above. In addition, while certain devices are shown, and with certain functionality being performed on certain devices, other suitable devices and process locations may be used, accordingly. That is, the embodiments have been shown and described herein with relation to specific network configurations (orientations, topologies, protocols, terminology, processing locations, etc.). However, the embodiments in their broader sense are not as limited, and may, in fact, be used with other types of networks, protocols, and configurations.

Moreover, while the present disclosure contains many other specifics, these should not be construed as limitations on the scope of any embodiment or of what may be claimed, but rather as descriptions of features that may be specific to particular embodiments of particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Further, although features may be described above as acting in certain combinations and even initially claimed as such, one or more features from a claimed combination can in some cases be excised from the combination, and the claimed combination may be directed to a sub-combination or variation of a sub-combination.

For instance, while certain aspects of the present disclosure are described in terms of being performed "by a server" or "by a controller", those skilled in the art will appreciate that agents of the application intelligence platform (e.g., application agents, network agents, language agents, etc.) may be considered to be extensions of the server (or controller) operation, and as such, any process step performed "by a server" need not be limited to local processing on a specific server device, unless otherwise specifically noted as such. Furthermore, while certain aspects are described as being performed "by an agent" or by particular types of agents (e.g., application agents, network agents, etc.), the techniques may be generally applied to any suitable software/hardware configuration (libraries, modules, etc.) as part of an apparatus or otherwise.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method, comprising:
   capturing, by a process, a business transaction associated with an application;
   determining, by the process, one or more application-based policies associated with a type of the business transaction;
   determining, by the process, an application-based priority for the business transaction based on the one or more application-based policies;
   obtaining, by the process in response to determining the application-based priority, an Internet Protocol (IP) address associated with the application;
   mapping, by the process, the application-based priority to a corresponding network-based priority different from the application-based priority; and
   instructing, by the process, a network controller to apply the corresponding network-based priority to the IP address associated with the application, causing the network controller to configure a computer network to manage network traffic associated with the IP address according to the corresponding network-based priority,
   wherein the corresponding network-based priority is created by converting one or more criteria of the one or more application-based policies into one or more numeric network metrics for the corresponding network-based priority.

2. The method as in claim 1, wherein the network controller comprises a software-defined wide area network (SD-WAN) controller.

3. The method as in claim 1, further comprising:
   preventing duplicate instructions to the network controller to apply network-based priorities to the IP address.

4. The method as in claim 1, further comprising:
   determining an end to the business transaction; and
   instructing, in response to the end of the business transaction, the network controller to cease the application of the corresponding network-based priority to the IP address associated with the application.

5. The method as in claim 1, further comprising:
   instructing the network controller to apply one or more pre-configured corresponding network-based policies to the IP address.

6. The method as in claim 1, further comprising:
   monitoring the application through one or more user application monitoring agents.

7. A tangible, non-transitory, computer-readable medium having computer-executable instructions stored thereon that, when executed by a processor on a computer, cause the computer to perform a method comprising:
   capturing a business transaction associated with an application;
   determining one or more application-based policies associated with a type of the business transaction;
   determining an application-based priority for the business transaction based on the one or more application-based policies;
   obtaining, in response to determining the application-based priority, an Internet Protocol (IP) address associated with the application;

mapping the application-based priority to a corresponding network-based priority different from the application-based priority; and instructing a network controller to apply the corresponding network-based priority to the IP address associated with the application, causing the network controller to configure a computer network to manage network traffic associated with the IP address according to the corresponding network-based priority, wherein the corresponding network-based priority is created by converting one or more criteria of the one or more application-based policies into one or more numeric network metrics for the corresponding network-based priority.

8. The computer-readable medium as in claim 7, wherein the network controller comprises a software-defined wide area network (SD-WAN) controller.

9. The computer-readable medium as in claim 7, wherein the method further comprises:

preventing duplicate instructions to the network controller to apply network-based priorities to the IP address.

10. The computer-readable medium as in claim 7, wherein the method further comprises:

determining an end to the business transaction; and instructing, in response to the end of the business transaction, the network controller to cease the application of the corresponding network-based priority to the IP address associated with the application.

11. The computer-readable medium as in claim 7, wherein the method further comprises:

instructing the network controller to apply one or more pre-configured corresponding network-based policies to the IP address.

12. An apparatus, comprising:

one or more network interfaces to communicate with a network;

a processor coupled to the network interfaces and configured to execute one or more processes; and a memory configured to store a process executable by the processor, the process, when executed, configured to:

capture a business transaction associated with an application;

determine one or more application-based policies associated with a type of the business transaction;

determine an application-based priority for the business transaction based on the one or more application-based policies;

obtain, in response to determining the application-based priority, an Internet Protocol (IP) address associated with the application;

map the application-based priority to a corresponding network-based priority different from the application-based priority; and instruct a network controller to apply the corresponding network-based priority to the IP address associated with the application, causing the network controller to configure a computer network to manage network traffic associated with the IP address according to the corresponding network-based priority, wherein the corresponding network-based priority is created by converting one or more criteria of the one or more application-based policies into one or more numeric network metrics for the corresponding network-based priority.

* * * * *